US012537973B2

(12) United States Patent
Budagavi et al.

(10) Patent No.: US 12,537,973 B2
(45) Date of Patent: Jan. 27, 2026

(54) VERTEX MOTION VECTOR PREDICTOR CODING FOR VERTEX MESH (V-MESH)

(71) Applicant: Samsung Electronics Co., Ltd., Suwon-si (KR)

(72) Inventors: Madhukar Budagavi, Plano, TX (US); Rajan Laxman Joshi, San Diego, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 186 days.

(21) Appl. No.: 18/479,789

(22) Filed: Oct. 2, 2023

(65) Prior Publication Data

US 2024/0137558 A1 Apr. 25, 2024
US 2024/0236362 A9 Jul. 11, 2024

Related U.S. Application Data

(60) Provisional application No. 63/527,996, filed on Jul. 20, 2023, provisional application No. 63/464,349, filed on May 5, 2023, provisional application No. 63/455,812, filed on Mar. 30, 2023, provisional application No. 63/454,858, filed on Mar. 27, 2023, (Continued)

(51) Int. Cl.

*H04N 19/54* (2014.01)
*H04N 19/52* (2014.01)
*H04N 19/597* (2014.01)
*H04N 19/70* (2014.01)

(52) U.S. Cl.

CPC ............ *H04N 19/54* (2014.11); *H04N 19/52* (2014.11); *H04N 19/597* (2014.11); *H04N 19/70* (2014.11)

(58) Field of Classification Search

None

See application file for complete search history.

(56) References Cited

U.S. PATENT DOCUMENTS 8,502,815 B2 8/2013 Stefanoski et al.
9,792,728 B2 10/2017 Luo et al.
(Continued)

FOREIGN PATENT DOCUMENTS

KR 20030073100 A 9/2003
WO 2022191543 A1 9/2022

OTHER PUBLICATIONS

International Search Report and Written Opinion issued Feb. 5, 2024 regarding International Application No. PCT/KR2023/016239, 10 pages.

(Continued)

*Primary Examiner* — Christopher Braniff

(57) ABSTRACT

An apparatus includes a communication interface configured to receive a compressed video bitstream and a processor operably coupled to the communication interface. The processor is configured to determine, for a vertex in the compressed video bitstream, one or more vertex neighbors based on a signaled limit to a number of the one or more vertex neighbors. The processor is also configured to identify, based on a vertex motion vector (VMV) identifier signaled in the compressed video bitstream, a VMV predictor from among a plurality of VMV predictors to use for the vertex. The processor is also configured to reconstruct a mesh frame based on the determined one or more vertex neighbors and the identified VMV predictor.

20 Claims, 12 Drawing Sheets

Related U.S. Application Data provisional application No. 63/438,177, filed on Jan. 10, 2023, provisional application No. 63/417,594, filed on Oct. 19, 2022.

(56) References Cited

U.S. PATENT DOCUMENTS

| | | | | |
|---|---|---|---|---|
| 10,347,052 | B2 | 7/2019 | Hemani et al. | |
| 2015/0002511 | A1 | 1/2015 | Ahn et al. | |
| 2017/0032580 | A1 | 2/2017 | Hemani et al. | |
| 2018/0041768 | A1* | 2/2018 | Koo | H04N 19/119 |
| 2021/0295566 | A1 | 9/2021 | Graziosi et al. | |
| 2023/0410374 | A1 | 12/2023 | Ahn et al. | |
| 2024/0022708 | A1* | 1/2024 | Tian | H04N 19/103 |
| 2024/0048763 | A1* | 2/2024 | Tian | H04N 19/172 |

OTHER PUBLICATIONS

"V-Mesh Test Model v1," WG 7, MPEG 3D Graphics and Haptics Coding, ISO/IEC JTC 1/SC 29/WG 07 N00404, Jul. 2022, 15 pages.
"WD 2.0 of V-DMC," MPEG 3D Graphics and Haptics Coding, ISO/IEC JTC 1/SC 29/WG 7 N00546, Jan. 2023, 76 pages.
"WD 3.0 of V-DMC," MPEG 3D Graphics and Haptics Coding, ISO/IEC JTC 1/SC 29/WG 07 N00611, Apr. 2023, 142 pages.
"WD 4.0 of V-DMC," MPEG 3D Graphics and Haptics Coding, ISO/IEC JTC 1/SC 29/WG 07 N00611, Aug. 2023, 145 pages.

* cited by examiner

| | | | |
|---|---|---|---|
| $v_A$ | $v_D$ | $v_C$ | $\emptyset$ |
| $v_B$ | $v_C$ | $v_A$ | $\emptyset$ |
| $v_C$ | $v_D$ | $\emptyset$ | $\emptyset$ |
| $v_D$ | $\emptyset$ | $\emptyset$ | $\emptyset$ |

| | | | |
|---|---|---|---|
| $v_A$ | $v_D$ | $v_C$ | $\emptyset$ |
| $v_B$ | $v_C$ | $v_A$ | $\emptyset$ |
| $v_C$ | $v_D$ | $\emptyset$ | $\emptyset$ |
| $v_D$ | $\emptyset$ | $\emptyset$ | $\emptyset$ |

VERTEX MOTION VECTOR PREDICTOR CODING FOR VERTEX MESH (V-MESH)

CROSS-REFERENCE TO RELATED APPLICATION AND PRIORITY CLAIM

This application claims priority under 35 U.S.C. § 119(e) to U.S. Provisional Patent Application No. 63/417,594 filed on Oct. 19, 2022, U.S. Provisional Patent Application No. 63/438,177 filed on Jan. 10, 2023, U.S. Provisional Patent Application No. 63/454,858 filed on Mar. 27, 2023, U.S. Provisional Patent Application No. 63/455,812 filed on Mar. 30, 2023, U.S. Provisional Patent Application No. 63/464,349 filed on May 5, 2023, and U.S. Provisional Patent Application No. 63/527,996 filed on Jul. 20, 2023, which are hereby incorporated by reference in their entirety.

TECHNICAL FIELD

This disclosure relates generally to multimedia devices and processes. More specifically, this disclosure relates to improved vertex motion vector predictor coding for vertex mesh (V-MESH).

BACKGROUND

Three hundred sixty degree (360°) video and three dimensional (3D) volumetric video are emerging as new ways of experiencing immersive content due to the ready availability of powerful handheld devices such as smartphones. While 360° video enables an immersive "real life," "being-there," experience for consumers by capturing the 360° outside-in view of the world, 3D volumetric video can provide a complete six degrees of freedom (DoF) experience of being immersed and moving within the content. Users can interactively change their viewpoint and dynamically view any part of the captured scene or object they desire. Display and navigation sensors can track head movement of a user in real-time to determine the region of the 360° video or volumetric content that the user wants to view or interact with. Multimedia data that is 3D in nature, such as point clouds or 3D polygonal meshes, can be used in the immersive environment. This data can be stored in a video format and encoded and compressed for transmission as a bitstream to other devices.

SUMMARY

This disclosure provides improved vertex motion vector predictor coding for vertex mesh (V-MESH).

In a first embodiment, an apparatus includes a communication interface configured to receive a compressed video bitstream and a processor operably coupled to the communication interface. The processor is configured to determine, for a vertex in the compressed video bitstream, one or more vertex neighbors based on a signaled limit to a number of the one or more vertex neighbors. The processor is also configured to identify, based on a vertex motion vector (VMV) identifier signaled in the compressed video bitstream, a VMV predictor from among a plurality of VMV predictors to use for the vertex. The processor is also configured to reconstruct a mesh frame based on the determined one or more vertex neighbors and the identified VMV predictor.

In a second embodiment, a method includes determining, for a vertex in a compressed video bitstream, one or more vertex neighbors based on a signaled limit to a number of the one or more vertex neighbors. The method also includes identifying, based on a vertex motion vector (VMV) identifier signaled in the compressed video bitstream, a VMV predictor from among a plurality of VMV predictors to use for the vertex. The method also includes reconstructing a mesh frame based on the determined one or more vertex neighbors and the identified VMV predictor.

In a third embodiment, an apparatus includes a communication interface and a processor operably coupled to the communication interface. The processor is configured to identify, for a vertex of a mesh frame, one or more vertex neighbors based on a set limit to a number of the one or more vertex neighbors. The processor is also configured to determine a plurality of vertex motion vector (VMV) predictors for the vertex based on the identified one or more vertex neighbors. The processor is also configured to map each of the plurality of VMV predictors to one of a plurality of VMV identifiers. The processor is configured to encode a compressed video bitstream signaling the set limit to the number of the one or more vertex neighbors and signaling one of the plurality of VMV identifiers indicating a VMV predictor from among a plurality of VMV predictors to use for the vertex.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
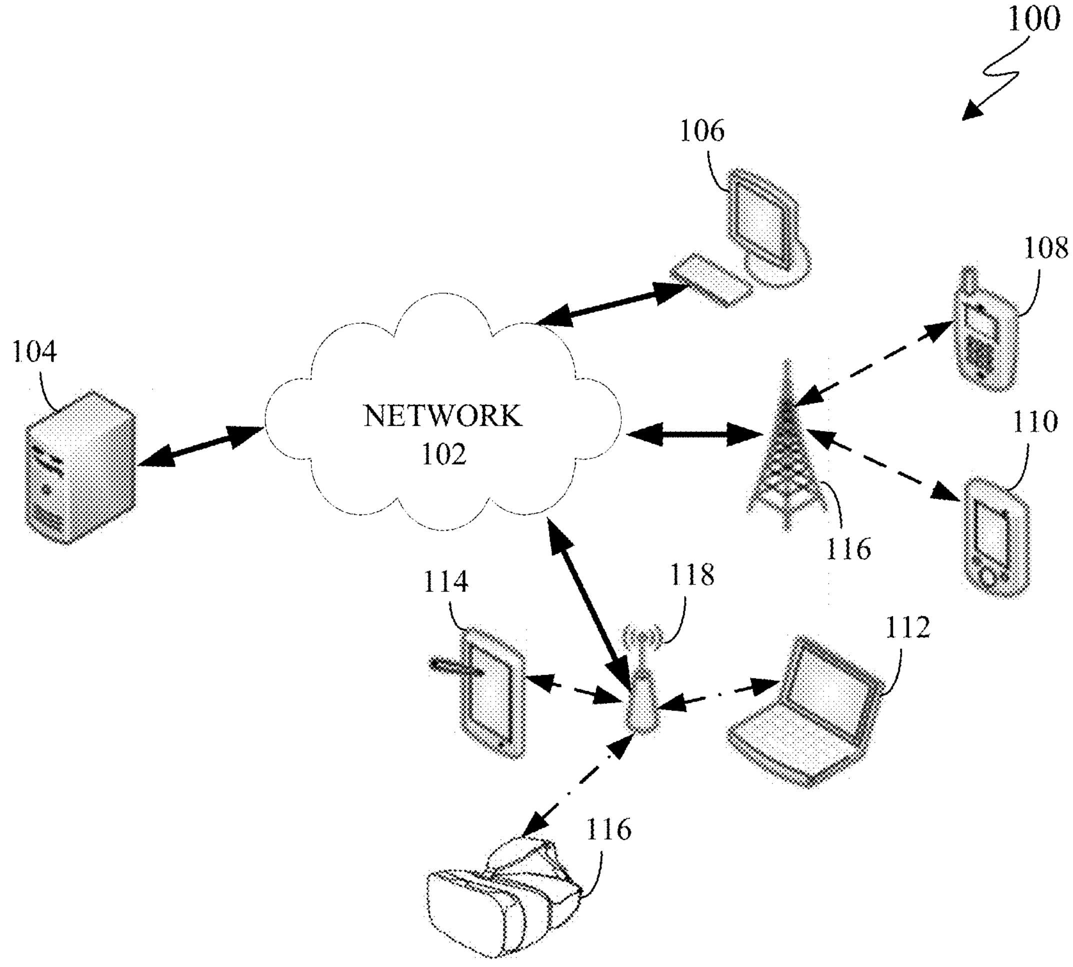
FIG. 1 illustrates an example communication system in accordance with this disclosure.

FIGS. 1 through 10, described below, and the various embodiments used to describe the principles of the present disclosure are by way of illustration only and should not be construed in any way to limit the scope of the disclosure. Those skilled in the art will understand that the principles of the present disclosure may be implemented in any type of suitably arranged device or system.

As noted above, three hundred sixty degree (360°) video and three dimensional (3D) volumetric video are emerging as new ways of experiencing immersive content due to the ready availability of powerful handheld devices such as smartphones. While 360° video enables an immersive "real life," "being-there," experience for consumers by capturing the 360° outside-in view of the world, 3D volumetric video can provide a complete six degrees of freedom (DoF) experience of being immersed and moving within the content. Users can interactively change their viewpoint and dynamically view any part of the captured scene or object they desire. Display and navigation sensors can track head movement of a user in real-time to determine the region of the 360° video or volumetric content that the user wants to view or interact with. Multimedia data that is 3D in nature, such as point clouds or 3D polygonal meshes, can be used in the immersive environment. This data can be stored in a video format and encoded and compressed for transmission as a bitstream to other devices.

A point cloud is a set of 3D points along with attributes such as color, normal directions, reflectivity, point-size, etc. that represent an object's surface or volume. Point clouds are common in a variety of applications such as gaming, 3D maps, visualizations, medical applications, augmented reality, virtual reality, autonomous driving, multi-view replay, and six degrees of freedom (DoF) immersive media, to name a few. Point clouds, if uncompressed, generally require a large amount of bandwidth for transmission. Due to the large bitrate requirement, point clouds are often compressed prior to transmission. Compressing a 3D object such as a point cloud, often requires specialized hardware. To avoid specialized hardware to compress a 3D point cloud, a 3D point cloud can be transformed into traditional two-dimensional (2D) frames and that can be compressed and later reconstructed and viewable to a user.

Polygonal 3D meshes, especially triangular meshes, are another popular format for representing 3D objects. Meshes typically consist of a set of vertices, edges and faces that are used for representing the surface of 3D objects. Triangular meshes are simple polygonal meshes in which the faces are simple triangles covering the surface of the 3D object. Typically, there may be one or more attributes associated with the mesh. In one scenario, one or more attributes may be associated with each vertex in the mesh. For example, a texture attribute (RGB) may be associated with each vertex. In another scenario, each vertex may be associated with a pair of coordinates, (u, v). The (u, v) coordinates may point to a position in a texture map associated with the mesh. For example, the (u, v) coordinates may refer to row and column indices in the texture map, respectively. A mesh can be thought of as a point cloud with additional connectivity information.

The point cloud or meshes may be dynamic, i.e., they may vary with time. In these cases, the point cloud or mesh at a particular time instant may be referred to as a point cloud frame or a mesh frame, respectively. Since point clouds and meshes contain a large amount of data, they require compression for efficient storage and transmission. This is particularly true for dynamic point clouds and meshes, which may contain 60 frames or higher per second.

As part of an encoding process, a base mesh can be coded using an existing mesh codec, and a reconstructed base mesh can be constructed from the coded original mesh. The reconstructed base mesh can then be subdivided into one or more subdivided meshes and a displacement field is created for each subdivided mesh. For example, if the reconstructed base mesh includes triangles covering the surface of the 3D object, the triangles are subdivided according to a number of subdivision levels, such as to create a first subdivided mesh in which each triangle of the reconstructed base mesh is subdivided into four triangles, a second subdivided mesh in which each triangle of the reconstructed base mesh is subdivided into sixteen triangles, and so on, depending on how many subdivision levels are applied. Each displacement field represents the difference between vertex positions of the original mesh and the subdivided mesh associated with the displacement field. Each displacement field is wavelet transformed to create level of detail (LOD) signals that are encoded as part of a compressed bitstream. During decoding, the displacements of each displacement field are added to their associated subdivided mesh to recreate the original mesh.

Previously, for a given vertex, a flag is used to indicate whether the vertex motion vector of that vertex is transmitted directly or whether the delta difference between the vertex motion vector of that vertex and its predicted value is transmitted. The predicted value of vertex motion vector is calculated as an average of the vertex motion vector of neighboring vertices, although embodiments of this disclosure can use any combination of the vertex motion vector of neighboring vertices, such as an average, weighted average, median, max, min, etc. Calculation of neighboring motion vectors is a complicated process and involves looping through all the triangles and their connectivities.

This disclosure provides an improved technique for determining vertex motion vector predictors and generating different mesh data structure tables based on picture type, providing improved compression efficiency. The techniques described in this disclosure have been shown to reduce the run-time of motion coding by around 30%, for example. These techniques include identifying, for a vertex of a mesh frame, one or more vertex neighbors based on a set limit to a number of the one or more vertex neighbors, determining a plurality of vertex motion vector (VMV) predictors for the vertex based on the identified one or more vertex neighbors, mapping each of the plurality of VMV predictors to one of a plurality of VMV identifiers, and encoding a compressed video bitstream signaling the set limit to the number of the one or more vertex neighbors and signaling one of the plurality of VMV identifiers indicating a VMV predictor from among a plurality of VMV predictors to use for the vertex, as well as reusing the identified vertex neighbors, associated with an intra mesh frame, for an inter mesh frames, as described in detail herein.

FIG. 1 illustrates an example communication system 100 in accordance with this disclosure. The embodiment of the communication system 100 shown in FIG. 1 is for illustration only. Other embodiments of the communication system 100 can be used without departing from the scope of this disclosure.

As shown in FIG. 1, the communication system 100 includes a network 102 that facilitates communication between various components in the communication system 100. For example, the network 102 can communicate IP packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-116. The client devices 106-116 may be, for example, a smartphone, a tablet computer, a laptop, a personal computer, a TV, an interactive display, a wearable device, a HMD, or the like. The server 104 can represent one or more servers. Each server 104 includes any suitable computing or processing device that can provide computing services for one or more client devices, such as the client devices 106-116. Each server 104 could, for example, include one or more processing devices, one or more memories storing instructions and data, and one or more network interfaces facilitating communication over the network 102. As described in more detail below, the server 104 can transmit a compressed bitstream, representing a point cloud or mesh, to one or more display devices, such as a client device 106-116. In certain embodiments, each server 104 can include an encoder. In certain embodiments, the server 104 can utilize improved vertex motion predictor coding as described in this disclosure.

Each client device 106-116 represents any suitable computing or processing device that interacts with at least one server (such as the server 104) or other computing device(s) over the network 102. The client devices 106-116 include a desktop computer 106, a mobile telephone or mobile device 108 (such as a smartphone), a PDA 110, a laptop computer 112, a tablet computer 114, and a HMD 116. However, any other or additional client devices could be used in the communication system 100. Smartphones represent a class of mobile devices 108 that are handheld devices with mobile operating systems and integrated mobile broadband cellular network connections for voice, short message service (SMS), and Internet data communications. The HMD 116 can display 360° scenes including one or more dynamic or static 3D point clouds. In certain embodiments, any of the client devices 106-116 can include an encoder, decoder, or both. For example, the mobile device 108 can record a 3D volumetric video and then encode the video enabling the video to be transmitted to one of the client devices 106-116. In another example, the laptop computer 112 can be used to generate a 3D point cloud or mesh, which is then encoded and transmitted to one of the client devices 106-116.

In this example, some client devices 108-116 communicate indirectly with the network 102. For example, the mobile device 108 and PDA 110 communicate via one or more base stations 118, such as cellular base stations or eNodeBs (eNBs). Also, the laptop computer 112, the tablet computer 114, and the HMD 116 communicate via one or more wireless access points 120, such as IEEE 802.11 wireless access points. Note that these are for illustration only and that each client device 106-116 could communicate directly with the network 102 or indirectly with the network 102 via any suitable intermediate device(s) or network(s). In certain embodiments, the server 104 or any client device 106-116 can be used to compress a point cloud or mesh, generate a bitstream that represents the point cloud or mesh, and transmit the bitstream to another client device such as any client device 106-116.

In certain embodiments, any of the client devices 106-114 transmit information securely and efficiently to another device, such as, for example, the server 104. Also, any of the client devices 106-116 can trigger the information transmission between itself and the server 104. Any of the client devices 106-114 can function as a VR display when attached to a headset via brackets, and function similar to HMD 116. For example, the mobile device 108 when attached to a bracket system and worn over the eyes of a user can function similarly as the HMD 116. The mobile device 108 (or any other client device 106-116) can trigger the information transmission between itself and the server 104.

In certain embodiments, any of the client devices 106-116 or the server 104 can create a 3D point cloud or mesh, compress a 3D point cloud or mesh, transmit a 3D point cloud or mesh, receive a 3D point cloud or mesh, decode a 3D point cloud or mesh, render a 3D point cloud or mesh, or a combination thereof. For example, the server 104 can compress a 3D point cloud or mesh to generate a bitstream and then transmit the bitstream to one or more of the client devices 106-116. As another example, one of the client devices 106-116 can compress a 3D point cloud or mesh to generate a bitstream and then transmit the bitstream to another one of the client devices 106-116 or to the server 104. In accordance with this disclosure, the server 104 and/or the client devices 106-116 can utilize improved vertex motion predictor coding as described in this disclosure.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
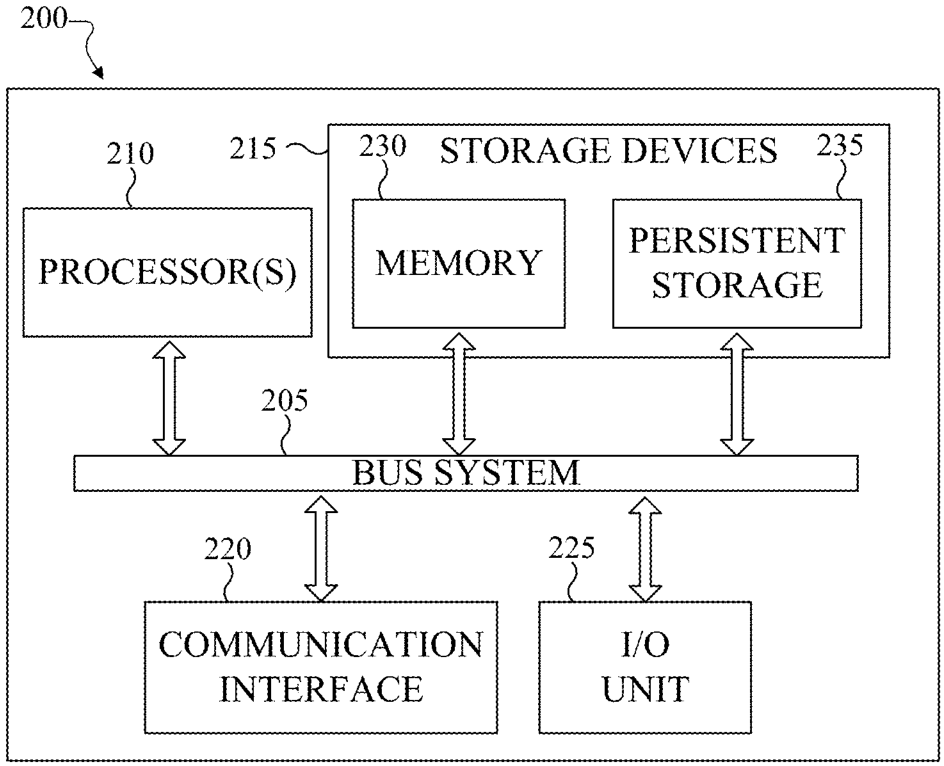
FIGS. 2 and 3 illustrate example electronic devices in accordance with this disclosure.
Figure 3:
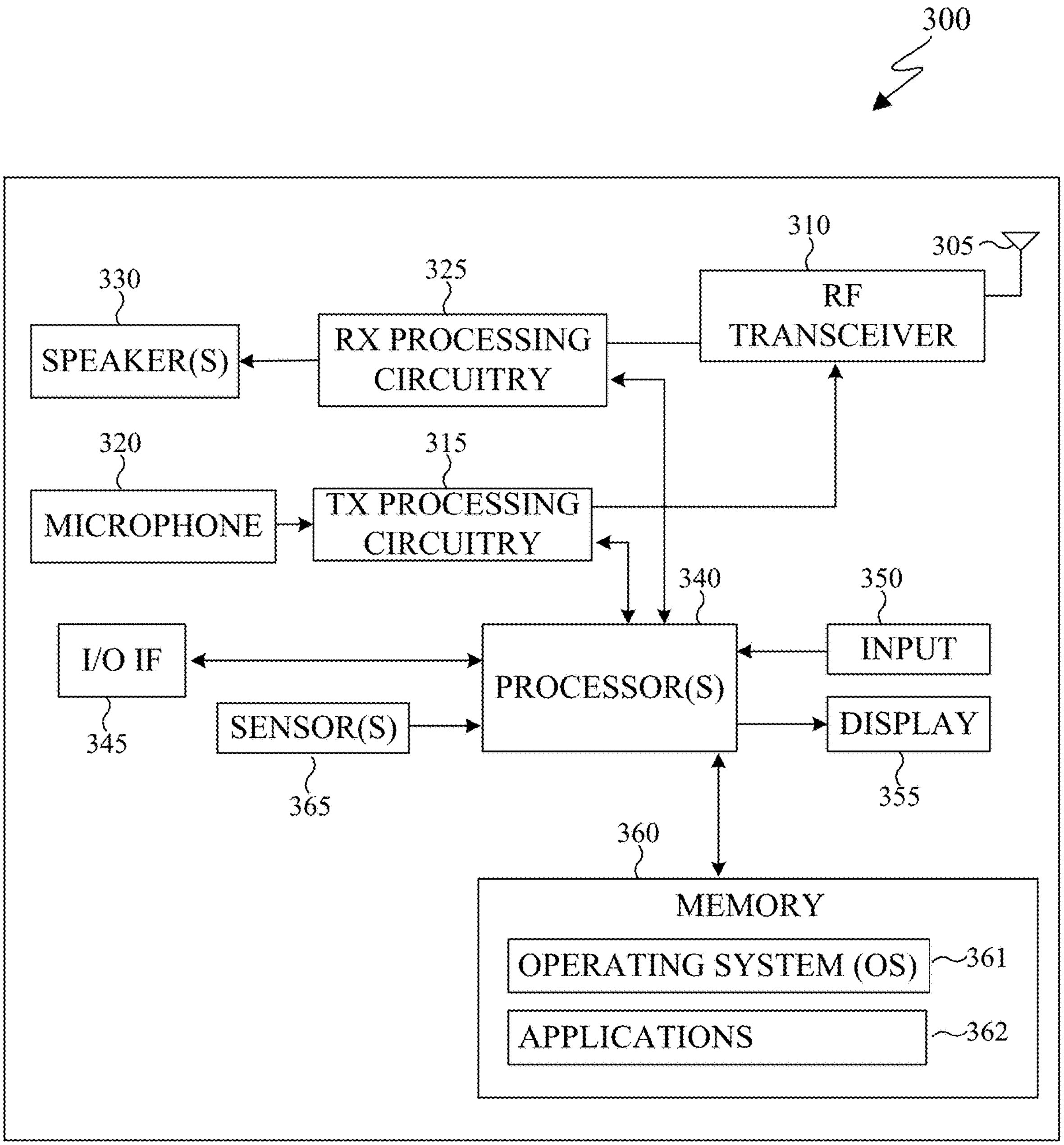

FIGS. 2 and 3 illustrate example electronic devices in accordance with this disclosure. In particular, FIG. 2 illustrates an example server 200, and the server 200 could represent the server 104 in FIG. 1. The server 200 can represent one or more encoders, decoders, local servers, remote servers, clustered computers, and components that act as a single pool of seamless resources, a cloud-based server, and the like. The server 200 can be accessed by one or more of the client devices 106-116 of FIG. 1 or another server.

As shown in FIG. 2, the server 200 can represent one or more local servers, one or more compression servers, or one or more encoding servers, such as an encoder. In certain embodiments, the encoder can perform decoding. As shown in FIG. 2, the server 200 includes a bus system 205 that supports communication between at least one processing device (such as a processor 210), at least one storage device 215, at least one communications interface 220, and at least one input/output (I/O) unit 225.

The processor 210 executes instructions that can be stored in a memory 230. The processor 210 can include any suitable number(s) and type(s) of processors or other devices in any suitable arrangement. Example types of processors 210 include microprocessors, microcontrollers, digital signal processors, field programmable gate arrays, application specific integrated circuits, and discrete circuitry.

In certain embodiments, the processor 210 can encode a 3D point cloud or mesh stored within the storage devices 215. In certain embodiments, encoding a 3D point cloud also decodes the 3D point cloud or mesh to ensure that when the point cloud or mesh is reconstructed, the reconstructed 3D point cloud or mesh matches the 3D point cloud or mesh prior to the encoding. In certain embodiments, the processor 210 can utilize improved vertex motion predictor coding as described in this disclosure.

The memory 230 and a persistent storage 235 are examples of storage devices 215 that represent any structure(s) capable of storing and facilitating retrieval of information (such as data, program code, or other suitable information on a temporary or permanent basis). The memory 230 can represent a random access memory or any other suitable volatile or non-volatile storage device(s). For example, the instructions stored in the memory 230 can include instructions for decomposing a point cloud into patches, instructions for packing the patches on 2D frames, instructions for compressing the 2D frames, as well as instructions for encoding 2D frames in a certain order in order to generate a bitstream. The instructions stored in the memory 230 can also include instructions for rendering the point cloud on an omnidirectional 360° scene, as viewed through a VR headset, such as HMD 116 of FIG. 1. The persistent storage 235 can contain one or more components or devices supporting longer-term storage of data, such as a read only memory, hard drive, Flash memory, or optical disc.

The communications interface 220 supports communications with other systems or devices. For example, the communications interface 220 could include a network interface card or a wireless transceiver facilitating communications over the network 102 of FIG. 1. The communications interface 220 can support communications through any suitable physical or wireless communication link(s). For example, the communications interface 220 can transmit a bitstream containing a 3D point cloud to another device such as one of the client devices 106-116.

The I/O unit 225 allows for input and output of data. For example, the I/O unit 225 can provide a connection for user input through a keyboard, mouse, keypad, touchscreen, or other suitable input device. The I/O unit 225 can also send output to a display, printer, or other suitable output device. Note, however, that the I/O unit 225 can be omitted, such as when I/O interactions with the server 200 occur via a network connection.

Note that while FIG. 2 is described as representing the server 104 of FIG. 1, the same or similar structure could be used in one or more of the various client devices 106-116. For example, a desktop computer 106 or a laptop computer 112 could have the same or similar structure as that shown in FIG. 2.

FIG. 3 illustrates an example electronic device 300, and the electronic device 300 could represent one or more of the client devices 106-116 in FIG. 1. The electronic device 300 can be a mobile communication device, such as, for example, a mobile station, a subscriber station, a wireless terminal, a desktop computer (similar to the desktop computer 106 of FIG. 1), a portable electronic device (similar to the mobile device 108, the PDA 110, the laptop computer 112, the tablet computer 114, or the HMD 116 of FIG. 1), and the like. In certain embodiments, one or more of the client devices 106-116 of FIG. 1 can include the same or similar configuration as the electronic device 300. In certain embodiments, the electronic device 300 is an encoder, a decoder, or both. For example, the electronic device 300 is usable with data transfer, image or video compression, image or video decompression, encoding, decoding, and media rendering applications.

As shown in FIG. 3, the electronic device 300 includes an antenna 305, a radio-frequency (RF) transceiver 310, transmit (TX) processing circuitry 315, a microphone 320, and receive (RX) processing circuitry 325. The RF transceiver 310 can include, for example, a RF transceiver, a BLUETOOTH transceiver, a WI-FI transceiver, a ZIGBEE transceiver, an infrared transceiver, and various other wireless communication signals. The electronic device 300 also includes a speaker 330, a processor 340, an input/output (I/O) interface (IF) 345, an input 350, a display 355, a memory 360, and a sensor(s) 365. The memory 360 includes an operating system (OS) 361, and one or more applications 362.

The RF transceiver 310 receives from the antenna 305, an incoming RF signal transmitted from an access point (such as a base station, WI-FI router, or BLUETOOTH device) or other device of the network 102 (such as a WI-FI, BLUETOOTH, cellular, 5G, LTE, LTE-A, WiMAX, or any other type of wireless network). The RF transceiver 310 down-converts the incoming RF signal to generate an intermediate frequency or baseband signal. The intermediate frequency or baseband signal is sent to the RX processing circuitry 325 that generates a processed baseband signal by filtering, decoding, and/or digitizing the baseband or intermediate frequency signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data from the processor 340. The outgoing baseband data can include web data, e-mail, or interactive video game data. The TX processing circuitry 315 encodes, multiplexes, and/or digitizes the outgoing baseband data to generate a processed baseband or intermediate frequency signal. The RF transceiver 310 receives the outgoing processed baseband or intermediate frequency signal from the TX processing circuitry 315 and up-converts the baseband or intermediate frequency signal to an RF signal that is transmitted via the antenna 305.

The processor 340 can include one or more processors or other processing devices. The processor 340 can execute instructions that are stored in the memory 360, such as the OS 361 in order to control the overall operation of the electronic device 300. For example, the processor 340 could control the reception of forward channel signals and the transmission of reverse channel signals by the RF transceiver 310, the RX processing circuitry 325, and the TX processing circuitry 315 in accordance with well-known principles. The processor 340 can include any suitable number(s) and type(s) of processors or other devices in any suitable arrangement. For example, in certain embodiments, the processor 340 includes at least one microprocessor or microcontroller. Example types of processor 340 include microprocessors, microcontrollers, digital signal processors, field programmable gate arrays, application specific integrated circuits, and discrete circuitry.

The processor 340 is also capable of executing other processes and programs resident in the memory 360, such as operations that receive and store data. The processor 340 can move data into or out of the memory 360 as required by an executing process. In certain embodiments, the processor 340 is configured to execute the one or more applications 362 based on the OS 361 or in response to signals received from external source(s) or an operator. Example, applications 362 can include an encoder, a decoder, a VR or AR application, a camera application (for still images and videos), a video phone call application, an email client, a social media client, a SMS messaging client, a virtual assistant, and the like. In certain embodiments, the processor 340 is configured to receive and transmit media content. In certain embodiments, the processor 340 can utilize improved vertex motion predictor coding as described in this disclosure.

The processor 340 is also coupled to the I/O interface 345 that provides the electronic device 300 with the ability to connect to other devices, such as client devices 106-114. The I/O interface 345 is the communication path between these accessories and the processor 340.

The processor 340 is also coupled to the input 350 and the display 355. The operator of the electronic device 300 can use the input 350 to enter data or inputs into the electronic device 300. The input 350 can be a keyboard, touchscreen, mouse, track ball, voice input, or other device capable of acting as a user interface to allow a user in interact with the electronic device 300. For example, the input 350 can include voice recognition processing, thereby allowing a user to input a voice command. In another example, the input 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 350 can be associated with the sensor(s) 365 and/or a camera by providing additional input to the processor 340. In certain embodiments, the sensor 365 includes one or more inertial measurement units (IMUs) (such as accelerometers, gyroscope, and magnetometer), motion sensors, optical sensors, cameras, pressure sensors, heart rate sensors, altimeter, and the like. The input 350 can also include a control circuit. In the capacitive scheme, the input 350 can recognize touch or proximity.

The display 355 can be a liquid crystal display (LCD), light-emitting diode (LED) display, organic LED (OLED), active matrix OLED (AMOLED), or other display capable of rendering text and/or graphics, such as from websites, videos, games, images, and the like. The display 355 can be sized to fit within an HMD. The display 355 can be a singular display screen or multiple display screens capable of creating a stereoscopic display. In certain embodiments, the display 355 is a heads-up display (HUD). The display 355 can display 3D objects, such as a 3D point cloud or mesh.

The memory 360 is coupled to the processor 340. Part of the memory 360 could include a RAM, and another part of the memory 360 could include a Flash memory or other ROM. The memory 360 can include persistent storage (not shown) that represents any structure(s) capable of storing and facilitating retrieval of information (such as data, program code, and/or other suitable information). The memory 360 can contain one or more components or devices supporting longer-term storage of data, such as a read only memory, hard drive, Flash memory, or optical disc. The memory 360 also can contain media content. The media content can include various types of media such as images, videos, three-dimensional content, VR content, AR content, 3D point clouds, meshes, and the like.

The electronic device 300 further includes one or more sensors 365 that can meter a physical quantity or detect an activation state of the electronic device 300 and convert metered or detected information into an electrical signal. For example, the sensor 365 can include one or more buttons for touch input, a camera, a gesture sensor, an IMU sensors (such as a gyroscope or gyro sensor and an accelerometer), an eye tracking sensor, an air pressure sensor, a magnetic sensor or magnetometer, a grip sensor, a proximity sensor, a color sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 365 can further include control circuits for controlling any of the sensors included therein.

As discussed in greater detail below, one or more of these sensor(s) 365 may be used to control a user interface (UI), detect UI inputs, determine the orientation and facing the direction of the user for three-dimensional content display identification, and the like. Any of these sensor(s) 365 may be located within the electronic device 300, within a secondary device operably connected to the electronic device 300, within a headset configured to hold the electronic device 300, or in a singular device where the electronic device 300 includes a headset.

The electronic device 300 can create media content such as generate a virtual object or capture (or record) content through a camera. The electronic device 300 can encode the media content to generate a bitstream, such that the bitstream can be transmitted directly to another electronic device or indirectly such as through the network 102 of FIG. 1. The electronic device 300 can receive a bitstream directly from another electronic device or indirectly such as through the network 102 of FIG. 1.

Although FIGS. 2 and 3 illustrate examples of electronic devices, various changes can be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). In addition, as with computing and communication, electronic devices and servers can come in a wide variety of configurations, and FIGS. 2 and 3 do not limit this disclosure to any particular electronic device or server.

Figure 4:
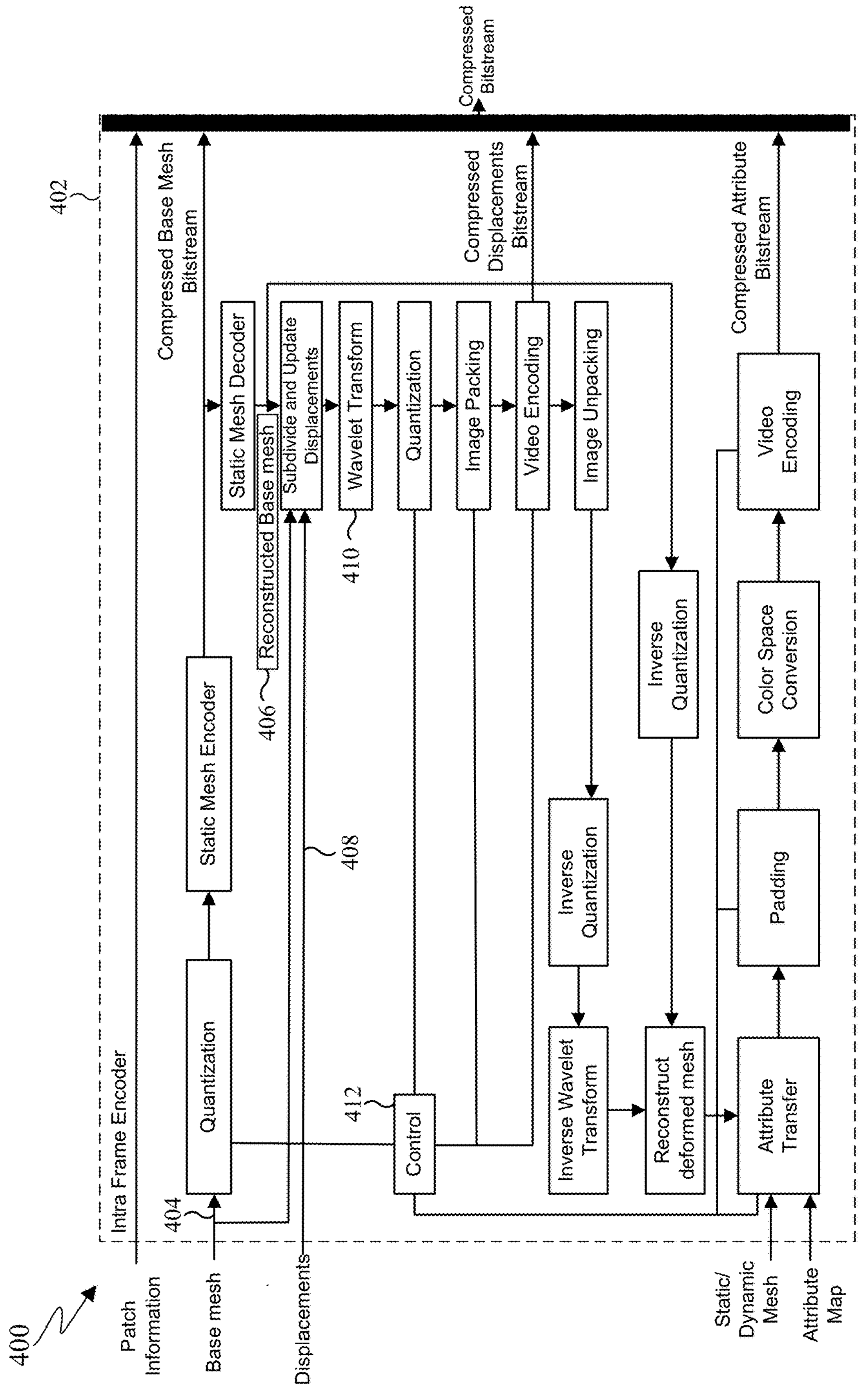
FIG. 4 illustrates an example intra-frame encoding process in accordance with this disclosure.

FIG. 4 illustrates an example intra-frame encoding process 400 in accordance with this disclosure. The intra-frame encoding process 400 illustrated in FIG. 4 is for illustration only. FIG. 4 does not limit the scope of this disclosure to any particular implementation of an intra-frame encoding process.

As shown in FIG. 4, the intra-frame encoding process 400 encodes a mesh frame using an intra-frame encoder 402. The intra-frame encoder 402 can be represented by, or executed by, the server 200 shown in FIG. 2 or the electronic device 300 shown in FIG. 3. A base mesh 404, which typically has a smaller number of vertices compared to the original mesh, is created and is quantized and compressed in either a lossy or lossless manner, and then encoded as a compressed base mesh bitstream. As shown in FIG. 4, a static mesh decoder decodes and reconstructs the base mesh, providing a reconstructed base mesh 406. This reconstructed base mesh 406 then undergoes one or more levels of subdivision and a displacement field is created for each subdivision representing the difference between the original mesh and the subdivided reconstructed base mesh. In inter-coding of a mesh frame, the base mesh 404 is coded by sending vertex motions instead of compressing the base mesh directly. In either case, a displacement field 408 is created. Each displacement of the displacement field 408 has three components, denoted by x, y, and z. These may be with respect to a canonical coordinate system or a local coordinate system where x, y, and z represent the displacement in local normal, tangent, and bi-tangent directions. It will be understood that multiple levels of subdivision can be applied, such that multiple subdivided mesh frames are created and a displacement field for each subdivided mesh frame is also created.

Let the number of 3-D displacement vectors in a displacement 408 of a mesh-frame be N. Let the displacement field be denoted by $d(i)=[d_x(i), d_y(i), d_z(i)]$, $0\le i<N$. The displacement fields 408 undergo one or more levels of wavelet transformation 410 to create level of detail (LOD) signals $d^k(i)$, $i=0\le i<N^k$, $0\le k<numLOD$, where k denotes the index of the level of detail, $N^k$ denotes the number of samples in the level of detail signal at level k, and numLOD denotes the number of LODs. The LOD signals d k (0 are scalar quantized.

As shown in FIG. 4, the quantized LOD signals corresponding to the displacement fields 408 are coded into a compressed bitstream. In various embodiments, the quantized LOD signals are packed into a 2D image/video using an image packing operation, and are compressed losslessly by using an image or video encoder. However, it is possible to use another entropy coder such as an asymmetric numeral systems (ANS) coder or a binary arithmetic entropy coder to code the quantized LOD signals. There may be other dependencies based on previous samples, across components, and across LODs that may be exploited.

As also shown in FIG. 4, image unpacking of the LOD signals is performed and an inverse quantization operation and an inverse wavelet transform operation are performed to reconstruct the LOD signals. Another inverse quantization operation is performed on the reconstructed base mesh 406, which is combined with the reconstructed LOD signals to reconstruct a deformed mesh. An attribute transfer operation is performed using the deformed mesh, a static/dynamic mesh, and an attribute map. A point cloud is a set of 3D points along with attributes such as color, normals, reflectivity, point-size, etc. that represent an object's surface or volume. These attributes are encoded as a compressed attribute bitstream. As shown in FIG. 4, the encoding of the compressed attribute bitstream may also include a padding operation, a color space conversion operation, and a video encoding operation. The various functions or operations shown in FIG. 4 can be controlled by a control process 412. The intra-frame encoding process 400 outputs a compressed bitstream that can, for example, be transmitted to, and decoded by, an electronic device such as the server 104 or the client devices 106-116. As shown in FIG. 4, the output compressed bitstream can include the compressed base mesh bitstream, the compressed displacements bitstream, and the compressed attribute bitstream.

Although FIG. 4 illustrates a block diagram of an example intra-frame encoding process 400, various changes may be made to FIG. 4. For example, the number and placement of various components of the intra-frame encoding process 400 can vary as needed or desired. In addition, the intra-frame encoding process 400 may be used in any other suitable process and is not limited to the specific processes described above. In certain embodiments, only the first (x) component of the displacement may be created and coded and the other two components (y and z) may be assumed to be 0. In such a case, a flag may be signaled in the bitstream to indicate that the bitstream contains only data corresponding to the first (x) component and the other two components (y and z) should be assumed to be zero when decompressing and reconstructing the displacement field 408. As another example, the intra-frame encoding process 400 of FIG. 4 can include determining vertex motion vector predictors, as described in this disclosure.

Figure 5A:
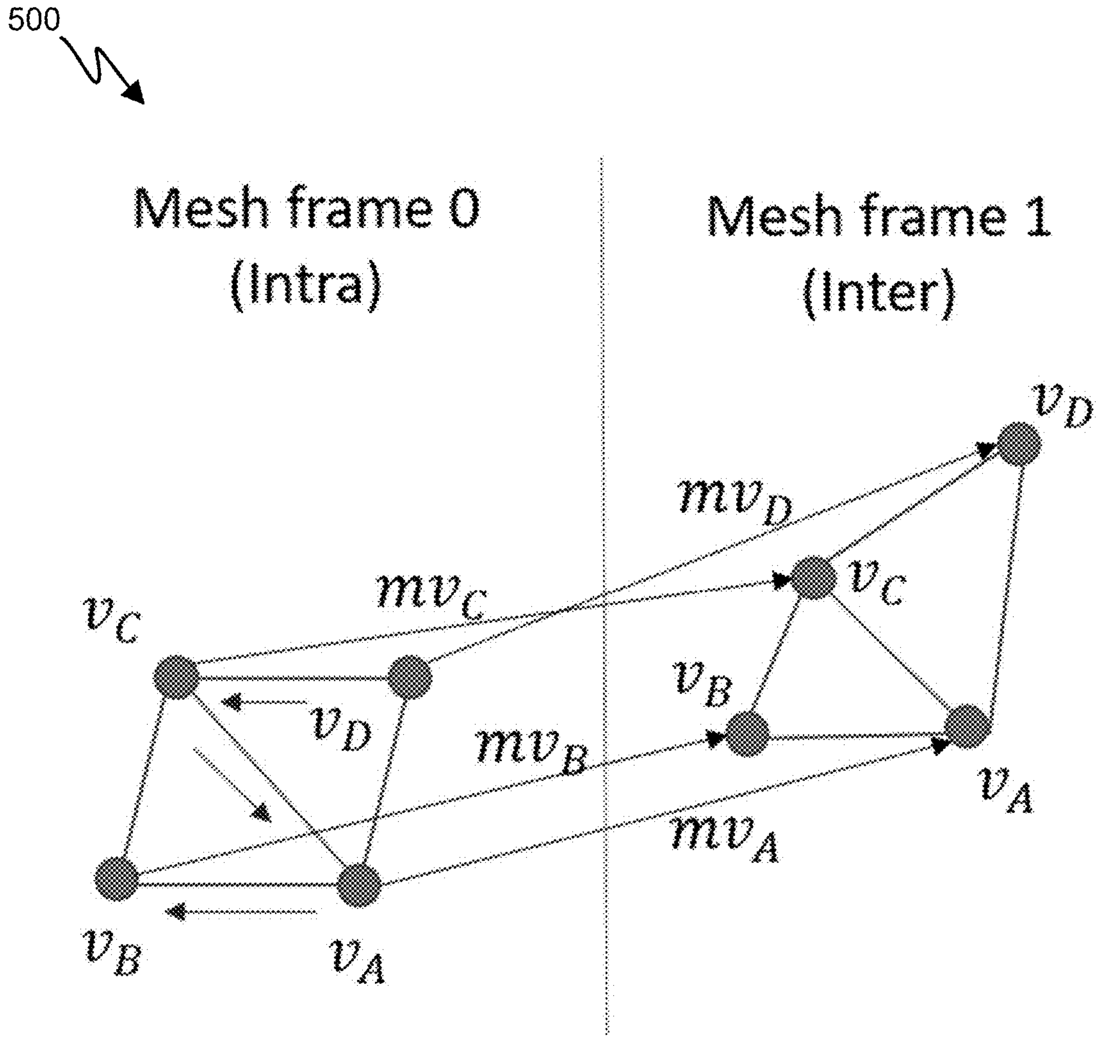
FIGS. 5A and 5B illustrate an example inter mesh frame coding process.
Figure 5B:
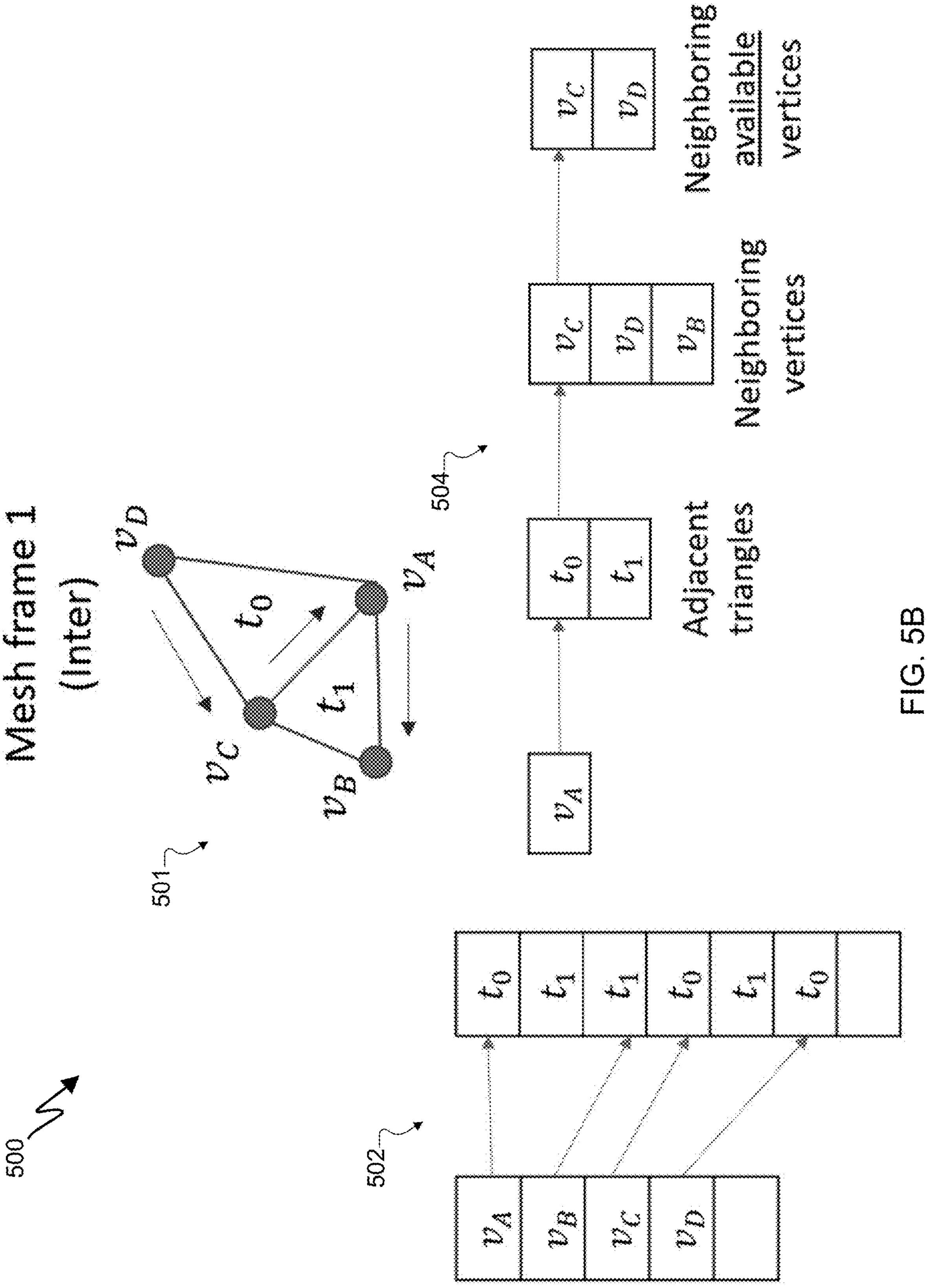

FIGS. 5A and 5B illustrate an example inter mesh frame coding process 500. The inter mesh frame coding process 500 illustrated in FIGS. 5A and 5B is for illustration only. FIGS. 5A and 5B do not limit the scope of this disclosure to any particular implementation of an inter mesh frame coding process. For ease of explanation, the process 500 of FIGS. 5A and 5B may be described as being performed using the electronic device 300 of FIG. 3. However, the process 500 may be used with any other suitable system and any other suitable electronic device, such as the server 200.

For inter mesh frames, the base mesh is coded by sending vertex 3D motions instead of compressing the base mesh directly. Inter coding is used when the mesh connectivity and the number of vertices is the same as the previous mesh frame. These vertex 3D motions are used to determine an inter mesh frame, such as shown in FIG. 5A, where the motion vector (my) for each vertex of the intra mesh frame is used to predict each vertex in the inter mesh frame.

The predicted value of the vertex motion vector is typically calculated as an average of the vertex motion vector of neighboring vertices, although embodiments of this disclosure can use any combination of the vertex motion vector of neighboring vertices, such as an average, weighted average, median, max, min, etc. For a given vertex, a flag can be used to indicate whether the 3D vertex motion vector of that vertex is transmitted directly or whether the delta difference between the vertex motion vector of that vertex and its predicted value is transmitted. For example, when using vertex motion vector coding, for a given vertex A, such as shown in FIG. 5A, the flag is used to indicate whether the vertex motion vector of A is transmitted or whether the delta difference between the vertex motion vector of A and its predicted value is transmitted. The predicted value of the vertex motion vector can thus be calculated as an average (or other type of combination) of the vertex motion vector of neighboring vertices, such as vertices B, C, and D in FIG. 5A. This can be expressed as follows.

$$dmv_A = mv_A - \text{pred}_{mv_A} \quad (1)$$

Here, $dmv_A$ is the delta difference between the vertex motion vector of A (mv A) and its predicted value ($\text{pred}_{mv_A}$).

As explained above, the predictor value can be calculated as the average motion vector of available neighboring vertices. This can be expressed as follows.

$$\text{pred}_{mv_A} = \text{average}(mv_C, mv_D) \quad (2)$$

To determine the available neighboring vertices for a group of vertices 501 in a mesh frame, the process 500 includes creating a vertex to triangle adjacency table at step 502, as shown in FIG. 5B. This can include the electronic device 300 looping through each vertex and calculating the number of adjacent triangles for each vertex, which can be a variable number. Then, as shown in FIG. 5B at step 502, the electronic device 300 loops through each vertex and creates a pointer table to reserve a variable amount of memory for each vertex in the vertex to triangle adjacency table. The electronic device 300 populates the vertex to triangle adjacency table with a variable number of triangle neighbors for all vertices.

The process 500 also includes determining a list of available vertex neighbors at step 504. As shown in FIG. 5B, for a given vertex (vertex A in this example), and assuming the vertex transmission order is D, C, A, B, the electronic device 300 calculates a list of neighboring vertices from the list of adjacent triangles created at step 502. In this example, this provides a list of neighboring vertices including vertices C, D, and B. Then, the electronic device 300 determines the neighboring available vertices by pruning the list to include only the vertices that are available, that is, the vertices that are already received. Thus, in the example shown in FIG. 5B, since vertex B is received after vertex A, vertex B is pruned from the list since it is not an available vertex. The electronic device 300 then determines the motion vector predictor for vertex A using the determined neighboring available vertices (e.g., the average motion of available neighboring vertices (vertices C and D)). It will be understood that this process can be performed for each vertex in the mesh frame to determine the motion vector predictor for each vertex to be used in creating the inter mesh frame from the previous intra mesh frame.

Although FIGS. 5A and 5B illustrate an example inter mesh frame coding process 500, various changes may be made to FIGS. 5A and 5B. For example, while shown as a series of steps, various steps in FIGS. 5A and 5B may overlap, occur in parallel, or occur any number of times.

Figure 6A:
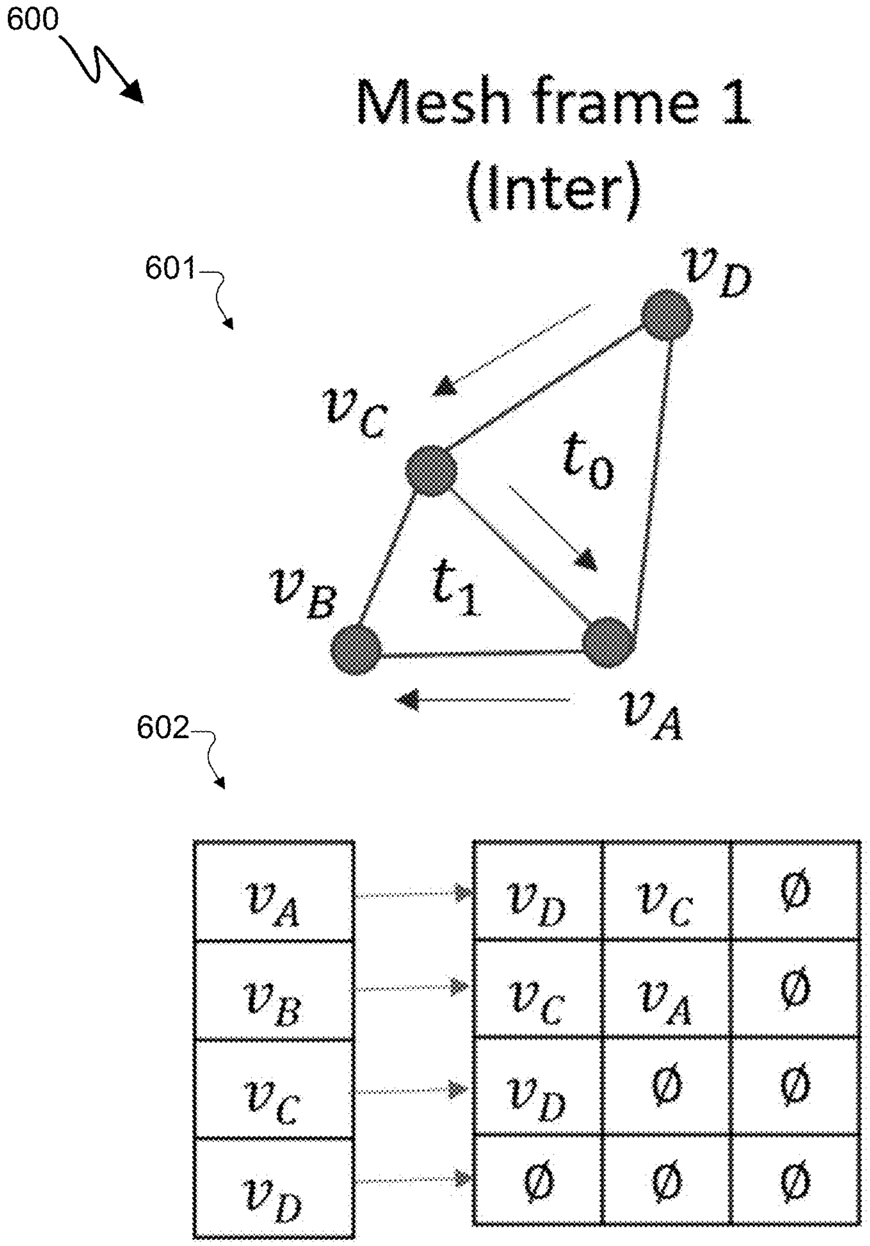
FIGS. 6A and 6B illustrate an example neighboring vertex determination process in accordance with this disclosure.
Figure 6B:
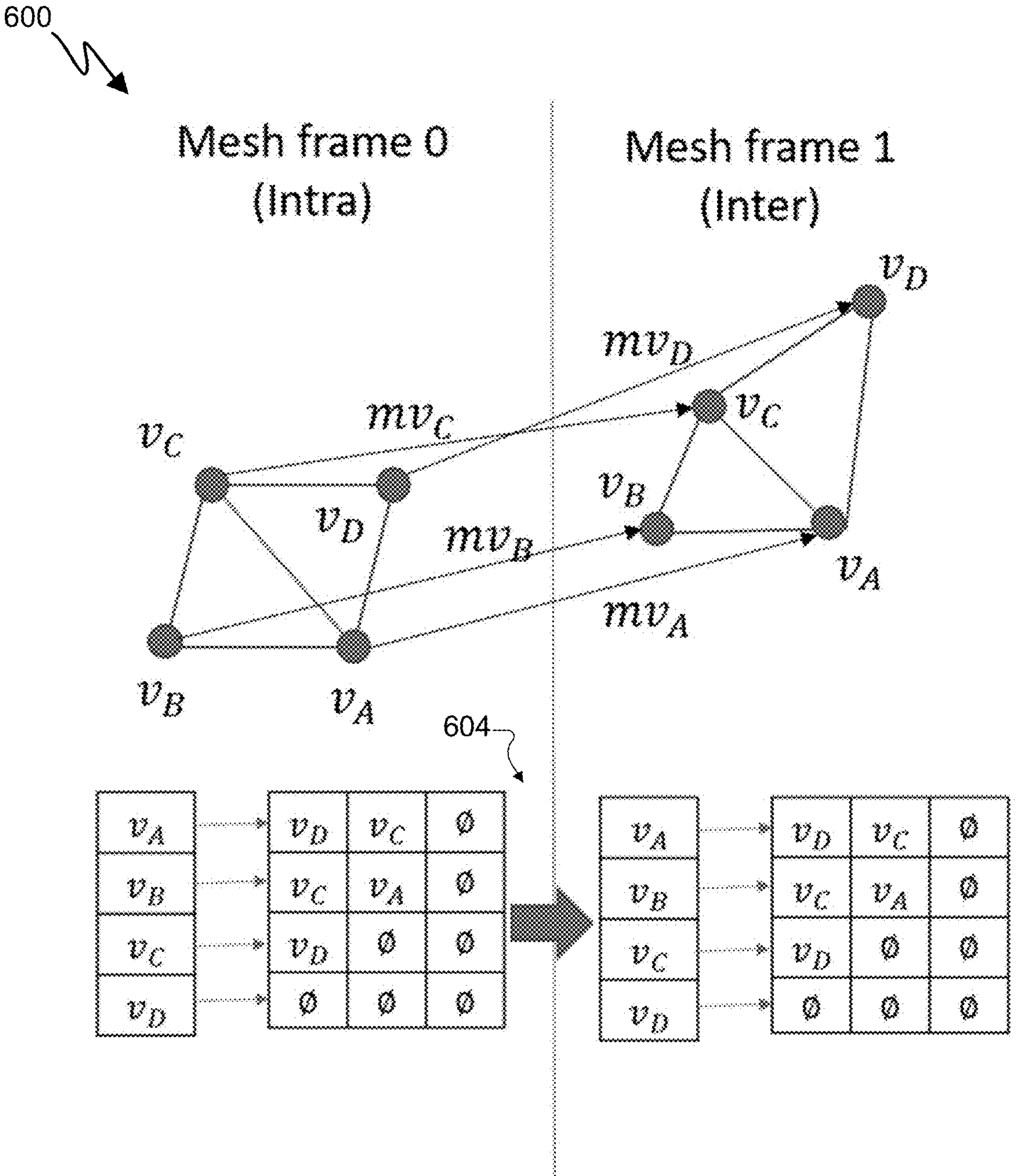

FIGS. 6A and 6B illustrate an example neighboring vertex determination process 600 in accordance with this disclosure. The process 600 illustrated in FIGS. 6A and 6B is for illustration only. FIGS. 6A and 6B do not limit the scope of this disclosure to any particular implementation of a neighboring vertex determination process. For ease of explanation, the process 600 of FIG. 6 may be described as being performed using the electronic device 300 of FIG. 3. However, process 600 may be used with any other suitable system and any other suitable electronic device, such as the server 200.

As described with respect to FIGS. 5A and 5B, calculation of neighboring motion vectors is a complicated process that involves looping through all the triangles and their connectivities. The majority of the complexity in vertex neighbor calculation results from accounting for a variable number of neighbors for each vertex. The process 600 of this disclosure imposes a limit on the maximum number of vertex neighbors used in the calculation of the motion vector predictor to improve the efficiency of inter mesh frame predictions.

As shown in FIG. 6A, for each vertex of a set of vertices 601 in a mesh frame, a fixed length table is created at step 602 that stores the vertex neighbors according to an imposed maximum number (i.e., a limit) of vertex neighbors. This maximum number of vertex neighbors is signaled in the bitstream so that the decoder can determine the maximum number of neighbors to use for the vertices. For example, as shown in FIG. 6A, the vertex neighbor limit is set to a value of 3, such that, at a maximum, only two vertex neighbors are stored for each vertex. This avoids needing to prune neighbors to find available neighbors.

Additionally, as shown in FIG. 6B, the process 600 can be further optimized by determining the fixed length vertex neighbor table only for intra mesh frames and, as shown at step 604, reusing the fixed length vertex neighbor table for inter mesh frames. In this way, the vertex neighbor table can be reused instead of recalculating neighbors for inter mesh frames because inter mesh frame coding is used only when the mesh connectivity and the number of vertices is the same as the previous mesh frame. This improves efficiency by avoiding having to re-determine neighboring vertices for inter mesh frames.

Although FIGS. 6A and 6B illustrate an example neighboring vertex determination process 600, various changes may be made to FIGS. 6A and 6B. For example, while shown as a series of steps, various steps in FIGS. 6A and 6B may overlap, occur in parallel, or occur any number of times. Additionally, the process 600 can be further optimized with respect to duplicate vertex removal to maintain temporal consistency of the vertex neighbor table. Typically, duplicate vertex removal changes the order of transmission of vertices, which changes the availability of neighboring vertices. This changes the vertex neighbor table from one frame to next even if the mesh connectivity remains the same. However, this disclosure provides that duplicate vertices can be calculated only for intra mesh frames and a duplicate vertex table can be reused for the inter mesh frame.

Figure 7:
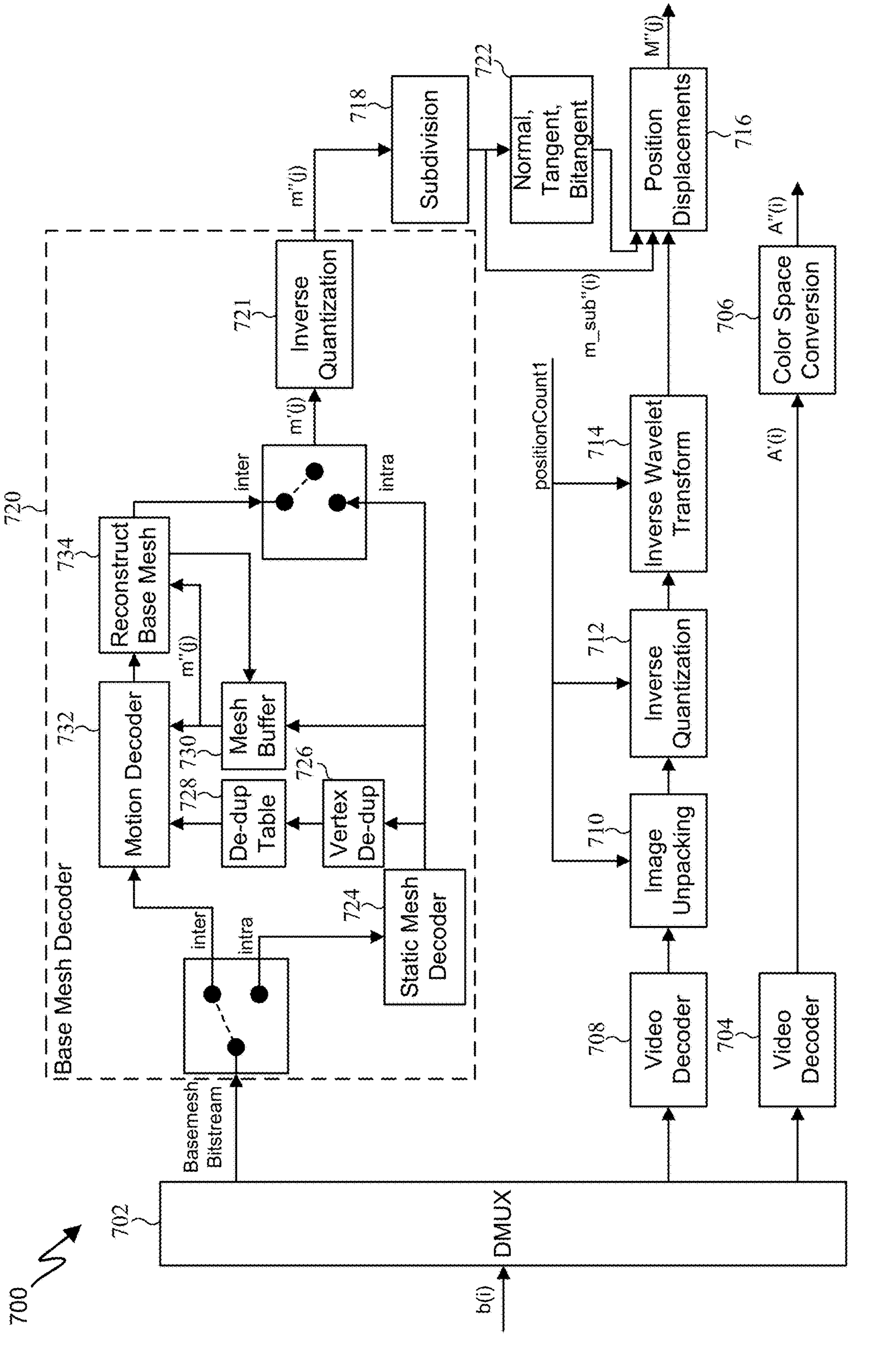
FIG. 7 illustrates an example mesh frame decoding process in accordance with this disclosure.

For example, FIG. 7 illustrates an example mesh frame decoding process 700 in accordance with this disclosure. The frame decoding process 700 illustrated in FIG. 7 is for illustration only. FIG. 7 does not limit the scope of this disclosure to any particular implementation of a mesh frame decoding process.

The decoding process 700 involves a demultiplexer 702 that receives an incoming bitstream. The demultiplexer separates out the various component bitstreams from the incoming bitstream, including the compressed base mesh bitstream, the compressed displacements bitstream, and the compressed attribute bitstream, such as described with respect to FIG. 4. The compressed attribute bitstream is decoded using a video decoder 704, the decoded attributes are processed using a color space conversion operation 706, and the original attributes for the mesh are recovered.

The decoding process 700 also includes decoding the displacements bitstream using a video decoder 708, which can, in some embodiments, be the same video decoder as the video decoder 704. The decoded displacements data undergoes an image unpacking operation 710, an inverse quantization operation 712, and an inverse wavelet transform operation 714, as part of recovering the positions displacements data 716. Recovering the positions displacements data 716 can also include performing one or more subdivision operations 718 on the mesh frame recovered using a base mesh decoder 720, and extracting x, y, z components 722 (normal, tangent, bitangent) from the subdivided mesh frames. The base mesh decoder 720 can perform an inverse quantization operation 721 before the subdivision operation 718 is performed.

The base mesh decoder 720 takes the base mesh bitstream provided by the demultiplexer 702 and reconstructs, from the base mesh bitstream, intra mesh frames using a static mesh decoder 724. The data from the intra mesh frames is used to perform a vertex de-duplication operation 726 and to construct a vertex de-duplication table 728. A mesh buffer 730 provides the decoded intra frames to a motion decoder 732. The motion decoder 732 also receives inter frame data and uses the intra frame data, inter frame data, and associated tables to reconstruct a base mesh at step 734.

However, previously, the reconstruction of the base mesh would be used as part of the vertex de-duplication operation 726 and creating the vertex de-duplication table 728. But, since, as described above, the duplicate vertex table can be reused for inter mesh frames, the process 700 does not need to perform the extra steps of using the reconstructed base mesh during vertex de-duplication and re-determining duplicates for inter mesh frames, improving the overall efficiency of the decoding process 700.

Although FIG. 7 illustrates a block diagram of an example frame decoding process 700, various changes may be made to FIG. 7. For example, the number and placement of various components of the frame decoding process 700 can vary as needed or desired. In addition, the frame decoding process 700 may be used in any other suitable process and is not limited to the specific processes described above. Also, while shown as a series of steps, various steps in FIG. 7 may overlap, occur in parallel, or occur any number of times.

The above described optimizations improve the overall coding efficiency. For example, it has been shown that D1, D2, Luma, Cb, and Cr Bjontegaard delta (BD) rates are all 0.0% when the number of neighboring motion vectors is limited to 3. There has also been shown that the optimizations provide a decrease in motion bits. The above optimizations have been found to provide approximately a 30% reduction in motion decoding time, and approximately a 50% reduction in vertex neighbor table memory usage.

Figure 8:
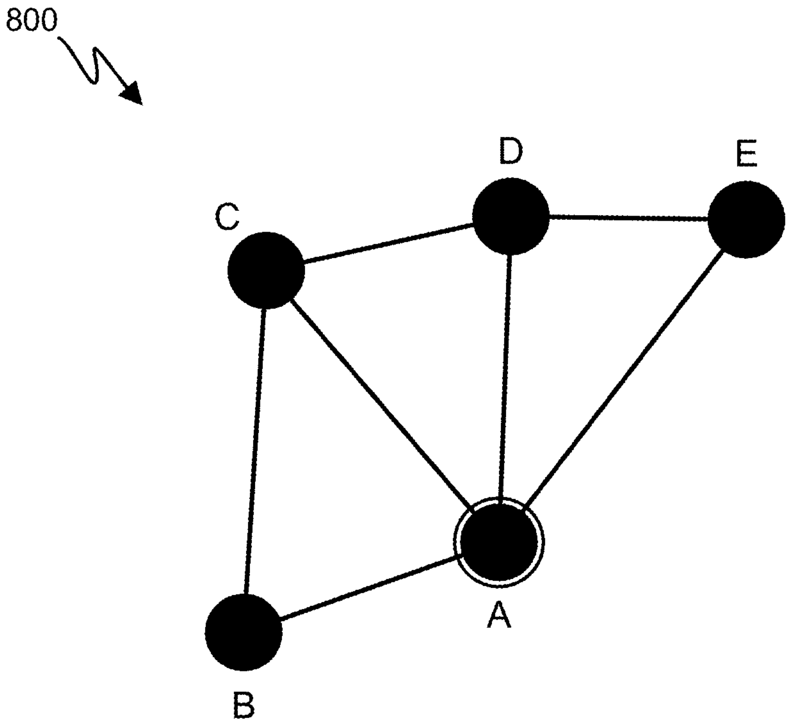
FIG. 8 illustrates an example set of vertices in accordance with this disclosure.

Additional information, examples, and embodiments with respect to these optimizations is described below with respect to FIG. 8. FIG. 8 illustrates an example set of vertices 800 in accordance with this disclosure. The example set of vertices 800 illustrated in FIG. 8 is for illustration only. FIG. 8 does not limit the scope of this disclosure to any particular set, number, or arrangement of vertices.

FIG. 8 provides an example set of vertices 800 that includes 5 vertices: vertex A, vertex B, vertex C, vertex D, and vertex E, which are used below to emphasize and illustrate various aspects of this disclosure. When using vertex motion vector coding, for a given vertex, such as vertex A in this example, a flag is used to indicate whether the vertex motion vector of A is transmitted or whether the delta difference between the vertex motion vector of A and its predicted value is transmitted. The predicted value of a vertex motion vector is calculated as a combination (e.g., an average, weighted average, median, max, min, etc.) of the vertex motion vector of neighboring vertices (e.g., B, C, D, E in FIG. 8).

Coding of the vertex motion information can include indicating which among the multiple vertex motion vectors (VMVs) to use in the decoder for each vertex. For instance, with respect to the example set of vertices 800, let mA be the actual VMV of vertex A. Let mB, mC, mD, mE be the actual VMVs of the neighboring vertices of A as shown in FIG. 8. In some embodiments, multiple VMV predictors are calculated for each vertex A. A syntax element vmv_id is transmitted to the receiver to indicate which among the multiple VMV predictors to use in the decoder.

For example, in some embodiments, vmv_id takes N+1 values where N is the number of neighboring vertices. For the example in FIG. 8, the vmv_id can take five values: 0, 1, 2, 3, and 4. In this example, the VMV predictor of A is calculated as shown in Table 1 below.

TABLE 1

| Vertex Motion Vector Predictor | |
|---|---|
| vmv_id | VMV predictor |
| 0 | mB |
| 1 | mC |
| 2 | mD |
| 3 | mE |
| 4 | 0 |

In Table 1, vmv_id 0 is associated with mB and indicates that, for vertex A, the VMV predictor is the delta difference between mA and mB, vmv_id 1 is associated with mC and indicates that, for vertex A, the VMV predictor is the delta difference between mA and mC, and so on. In Table 1, the vmv_id of 4 is mapped to a 0 value, which indicates that the VMV predictor is mA itself. The mapping between vmv_id and VMV predictor is just an example mapping in Table 1. It will be understood that other mappings can be used.

In some embodiments, the vmv_id takes N+2 values where N is the number of neighboring vertices. For the example in FIG. 8, the vmv_id can take six values: 0, 1, 2, 3, 4, and 5. In this example, the VMV predictor of A is calculated as shown in Table 2 below.

TABLE 2

| Vertex Motion Vector Predictor | |
|---|---|
| vmv_id | VMV predictor |
| 0 | mB |
| 1 | mC |
| 2 | mD |
| 3 | mE |
| 4 | 0 |
| 5 | Average (mB, mC, mD, mE) |

Table 2 differs from Table 1 in that Table 2 also includes an additional vmv_id having a value of 5 that is mapped to an average (or other type of combination) of mB, mC, mD, and mE. The mapping between vmv_id and VMV predictor is just an example mapping in Table 2. It will be understood that other mappings can be used.

In some embodiments (e.g., as shown in Table 2), the vmv_id signals the use of a particular VMV predictor out of a set multiple VMV predictors which contains the average of a subset of all neighboring VMVs, a zero VMV, and/or at least one VMV of a neighboring vertex.

In some embodiments (e.g., as shown in Table 1), the vmv_id signals the use of a particular VMV predictor out of a set multiple VMV predictors which contains a zero VMV, and/or at least one VMV of a neighboring vertex.

In some embodiments (e.g., where other mappings are generalized), the vmv_id signals the use of a particular VMV predictor out of a set multiple VMV predictors which includes the median of a subset or all neighboring VMVs, a zero VMV, and/or at least one VMV of a neighboring vertex. In some embodiments, the syntax element vmv_id can be coded with any entropy coding technique, such as unary code, exp-golomb code, Huffman code, arithmetic code, etc.

In some embodiments, the set of neighboring vertices for each and every vertex is pre-calculated from the vertex connectivity of the reference mesh from which the current mesh is being predicted. The neighboring vertex information can be stored in a table form or by using other data structures such as linked lists, trees, etc.

For example, Table 3, below, shows an example of a neighboring vertices table for the mesh of FIG. 8 assuming vertices are transmitted in the order A, B, C, D, E.

TABLE 3

Neighboring Vertices Table

| Vertex | Neighboring vertices | |
|---|---|---|
| A | No neighbors | |
| B | A | |
| C | A | B |
| D | A | C |
| E | D | A |

Note that though vertex A has vertices B, C, D, E as neighbors in FIG. 8, since A is the first vertex transmitted, there is no other data available to build a predictor. Hence, from a VMV predictor calculation perspective, vertex A has no neighbors. It will be understood that the neighboring vertices table of Table 3 is with respect to the unoptimized process in which all available neighbors from vertex are determined, such as discussed with respect to FIGS. 5A and 5B.

In some embodiments, every reference mesh in a dynamic mesh sequence has an associated neighboring vertex table that is valid as long as the reference mesh is valid, i.e., in the reference decoded mesh buffer. This way, when a reference mesh is used in temporal prediction, the neighboring vertex table can be readily used to calculate VMV predictors.

As described in this disclosure, such as with respect to FIGS. 6A and 6B, the maximum number of neighboring vectors used in VMV predictor calculations can be restricted to a fixed value to improve efficiency. For example, if the maximum number of neighboring vertices shown in Table 3 is fixed to 1, this results in Table 4, below.

TABLE 4

Neighboring vertices table with fixed maximum number of neighbors (max_num_neighbors_vmv = 1)

| Vertex | Neighboring vertices |
|---|---|
| A | No neighbors |
| B | A |
| C | A |
| D | A |
| E | D |

Let N be the total number of available neighbors, then in some embodiments, the VMC predictor is calculated using max_num_neighbors_vmv−1 neighbors in order and the last available neighbor. For example, when max_num_neighbors_vmv=3, instead of using mB, mC, mD in order, the VMV predictor is calculated using mB, mC, and mE.

In some embodiments, the maximum number of neighboring vertices used in calculating the VMV predictor is signaled in the bitstream using a syntax element, such as "max_num_neighbors_vmv" or some other name. This syntax element can be signaled at a mesh level, a sub-mesh level, or a sequence level, etc.

In some embodiments, the VMV predictor is calculated using a combination of VMVs of neighboring vertices and also the VMV of the temporally collocated vertex in the reference mesh. If VMVs of neighboring vertices are not available, then only the VMV of the temporally collocated vertex in the reference mesh is used.

In some embodiments, the predicted VMV is calculated as a weighted sum of VMVs of neighboring vertices and also the VMV of the temporally collocated vertex in the reference mesh. The weights can be uniform or non-uniformly varied. The weights can be signaled in the bitstreams or fixed apriori to known values.

As described in this disclosure with respect to FIGS. 5A and 5B, in some embodiments, a table data structure is created to store the neighboring vertices (or vertex indices in some embodiments) for all the vertices in a mesh. This table data structure can be referred to as vertex adjacency table. Creation of the vertex adjacency table can be expressed as follows:

```
numNeighborsTable[v] = 0 for all vertices v in the mesh
for all triangles in a mesh,
  let v1, v2, v3 be the vertices of a triangle
  AddNeighbor(v1, v2)
  AddNeighbor(v2, v1)
  AddNeighbor(v1, v3)
  AddNeighbor(v3, v1)
  AddNeighbor(v3, v2)
  AddNeighbor(v2, v3)
AddNeighbor(vertex vA, vertex vB)
  if(vB is available)
    if(vB is not already a neighbor of vA in vertexAdjacencyTable)
      n = numNeighborsTable[vA]
      vertexAdjacencyTable[vA][n] = vB
      numNeighborsTable[vA]++
```

In various embodiments, the table can be stored as a 1D vector, 2D array, list, etc., or other similar data structures. As shown above, let "numNeighborsTable" be the table that stores the number of available neighbors for each vertex in the mesh. In the encoder, a vertex is said to be available if it has already been processed for transmission. In the decoder, a vertex is said to be available if it has already been received and decoded. In this example, the "AddNeighbor( )" procedure adds a vertex vB as a neighbor of vA if vB is available and not already present in the numNeighborsTable.

In various embodiments, for calculating the VMV predictor for any given vertex, the neighboring vertex numbers or IDs are first read from the neighboring vertex table. The motion vectors corresponding to these neighboring vertices are then used to calculate the VMV predictor based on the vmv_id (such as the average, median etc. of the VMVs of the neighboring vertices). This can be expressed as follows for calculating the vertex motion vector predictor for a vertex vA:

```
Read the number of available neighbors, N, for vA by indexing into
numNeighborsTable. N = numNeighborsTable[vA]
Index into vertexAdjacencyTable to read the list of available neighboring vertices:
  v0 = vertexAdjacencyTable[vA][0],
  v1 = vertexAdjacencyTable[vA][1],
  ...,
  vNm1 = vertexAdjacencyTable[vA][N−1]
Vertex motion vector predictor is the average of motion vectors of v1, v2, .., vNm1.
```

In some embodiments, other combination methods such as weighted average, median, max, min, etc. can be used instead of the average (e.g., based on the vmv_id as discussed above).

In some embodiments, the maximum number of available neighbors (the above-mentioned syntax element: max_num_neighbors_vmv or other name) can be fixed to a predetermined valued that is signaled to the decoder in the sequence, frame, sub-mesh, slide, sub-frame, tile, etc. header.

In some embodiments, the vertexAdjacencyTable is created only for intra mesh frames. The vertexAdjacencyTable is reused for subsequent inter mesh frames, which can be expressed as shown below:

```
if(current frame is INTRA coded)
  Create vertexAdjacencyTable
  Use vertexAdjacencyTable for calculating vertex motion vector predictor
else
  Use vertexAdjacencyTable of previous INTRA coded picture for calculating vertex
motion vector predictor
```

In some embodiments, the vertex adjacency table is created for intra mesh frames. In some embodiments, when hierarchical inter coding is used, the vertex adjacency table is inherited from the reference mesh frames (which are already coded intra mesh frames or other inter mesh frames) and not recalculated.

As described with respect to FIGS. 6A, 6B, and 7, a duplicate vertices table can also be used in mesh coding. Duplicated vertices are vertices that have the identical geometry positions in the reference submeshes. Duplicate vertices can occur, for instance, when there is a T-junction in the mesh. An example duplicate vertices table is shown in Table 5 below.

TABLE 5

Duplicate vertices table

| Table index | Example vertex value | Vertex mapping |
|---|---|---|
| 0 | (0, 0, 0) | 0 |
| 1 | (1, 0, 0) | 1 |
| 2 | (0, 1, 0) | 2 |
| 3 | (1, 0, 0) | 1 |
| 4 | (1, 1, 0) | 3 |
| 5 | (2, 1, 3) | 4 |
| 6 | (1, 1, 0) | 3 |

Table 5 contains vertex mapping information. In this example, the second vertex (table index 1) and the fourth vertex (table index 3) are duplicated vertices, and thus they are mapped to the same value of 1. The fifth vertex and the seventh vertex are duplicated vertices, and thus they are mapped to the same value of 3. Other mechanisms for indicating duplicate vertices can be also used without departing from the scope of this disclosure.

In some embodiments, the table that stores information about duplicate vertices is created for intra frames. When hierarchical inter coding is used, the duplicate vertices table/data structure is inherited from the reference mesh frames (which are already coded intra mesh frames or other inter mesh frames) and not recalculated.

In some embodiments, a flag is signaled to indicate that the duplicate vertices table/data structure is not calculated for inter frames but instead it is inherited from the reference mesh frames (which are already coded intra mesh frames or other inter mesh frames). In some embodiments, other mesh related tables can be created based on mesh frame type.

Various standards have been proposed with respect to vertex mesh (V-MESH) and dynamic mesh coding. The following documents are hereby incorporated by reference in their entirety as if fully set forth herein:

"V-Mesh Test Model v1," ISO/IEC SC29 WG07 N00404, July 2022.

"WD 2.0 of V-DMC", ISO/IEC SC29 WG07 N00546, January 2023.

"WD 3.0 of V-DMC", ISO/IEC SC29 WG07 N00611, April 2023.

"WD 4.0 of V-DMC," ISO/IEC JTC 1/SC 29/WG 07 N00611, August 2023.

To provide the vertex motion vector predictor improvements according to this disclosure, the standards can be updated to specify the following:

H.8.1.3.1.1 General Basemesh Sequence Parameter Set RBSP Syntax

| | Descriptor |
|---|---|
| bmesh_sequence_parameter_set_rbsp( ) { | |
| **bmsps_sequence_parameter_set_id** | u(4) |
| bmesh_profile_tier_level( ) | |
| **bmsps_intra_mesh_codec_id** | u(8) |
| **bmsps_inter_mesh_codec_id** | u(8) |
| **bmsps_inter_mesh_motion_group_size_minus1** | u(8) |
| **bmsps_inter_mesh_max_num_neighbors_minus1** | u(8) |
| **bmsps_geometry_3d_bit_depth_minus1** | u(5) |
| **bmsps_facegroup_segmentation_method** | ue(v) |
| **bmsps_mesh_attribute_count** | u(7) |
| for( i = 0; i < bmsps_mesh_attribute_count; i++ ) { | |
| **bmsps_mesh_attribute_type_id**[ i ] | u(4) |
| **bmsps_attribute_bit_depth_minus1**[ i ] | u(5) |
| **bmsps_attribute_msb_align_flag**[ i ] | u(1) |
| } | |
| **bmsps_log2_max_mesh_frame_order_cnt_lsb_minus4** | ue(v) |
| **bmsps_max_dec_mesh_frame_buffering_minus1** | ue(v) |
| **bmsps_long_term_ref_mesh_frames_flag** | u(1) |
| **bmsps_num_ref_mesh_frame_lists_in_bmsps** | ue(v) |
| for( i = 0; i < bmsps_num_ref_mesh_frame_lists_in_bmsps; i++ ) | |
| bmesh_ref_list_struct( i ) | |
| **bmsps_extension_present_flag** | u(1) |
| if( bmsps_extension_present_flag ) { | |
| **bmsps_extension_count_minus1** | u(7) |
| } | |
| if( bmsps_extension_present_flag ){ | |
| **bmsps_extensions_length_minus1** | ue(v) |
| while( more_rbsp_data( ) ) | |
| **bmsps_extension_data_byte** | u(1) |
| } | |
| rbsp_trailing_bits( ) | |
| } | |

H.8.3.1.1 General Basemesh Sequence Parameter Set RBSP Semantics

. . .

bmsps_inter_mesh_max_num_neighbors_minus1 plus 1 indicates the maximum number of vertex neighbors to use in the calculation of motion vector predictor. bmsps_inter_mesh_max_num_neighbors_minus1 shall be in the range of 0 to 255, inclusive.

. . .

H.11.1 General

The reconstruction process proceeds by invoking the various processes described below. INTRA submeshes are reconstructed as defined in H.11.2 and the post-reconstruction process described in Section H.11.4 is invoked with the reconstructed submesh as inputs, and the parameters referenceSubmeshIntegratedIndices, referenceSubmeshDupVertCount, and the integrated submesh as outputs. The vertex neighbor table is then derived as defined in H.11.6 with the integrated submesh as input and tables submeshVertexNeighbours and submeshVertexNeighboursCounts as output. INTER submeshes are reconstructed as defined in H.11.3 and the post-reconstruction process described in Section H.11.5 is invoked with the reconstructed submesh, and the parameters referenceSubmeshIntegratedIndices, referenceSubmeshDupVertCount as inputs, and the integrated submeshes as outputs.

H.11.2 Reconstruction of Vertices for INTRA Submeshes

H.11.3 Reconstruction of Vertices for INTER Submeshes

Inputs to this process are:

motionGroupSize which is the size of vertices grouping in motion vector coding.

submeshFaceCount, which is a variable indicating the number of faces in the current and in the reference submeshes.

submeshFaceIndices, which is a 2D array of size submeshFaceCount by 3 indicating the connectivity indices associated with the current and with the reference submeshes.

referenceSubmeshVertexPositions, which is a 2D array of size submeshVertexCount by 3 indicating the positions of the reference submesh positions.

referenceSubmeshDupVertCount, which is a variable indicating the pair number of duplicated vertices in the reference submeshes.

referenceSubmeshVertexCountClean, which is a variable indicating the number of vertices in the reference integrated submeshes.

referenceSubmeshIntegratedIndices, which is a 2D array of size referenceSubmeshDupVertCount by 2 indicating the index pairs of the duplicated vertices in the reference submeshes. The two indices in each pair denote the two vertices are duplicated, i.e., with the same positions.

referenceSubmeshVertexPositionsClean, which is a 2D array of size referenceSubmeshVertexCountClean by 3 indicating the positions of the reference integrated submesh positions.

submeshVertexNeighboursCounts, which is a 1D array indicating the number of neighbours for each vertex of the submesh.

submeshVertexNeighbours, which is a 2D array of size submeshVertexCount by (bmsps_inter_mesh_max_num_neighbors_minus1+1) indicating for each vertex v the indices of its neighbours according to the mesh connectivity.

The outputs of this process is currentSubmeshVertexPositions, which is a 2D array of size submeshVertexCount by 3 indicating the positions of the current frame submesh.

Because the duplicated vertices are integrated in the reference submesh, submeshVertexCount is larger than referenceSubmeshVertexCountClean and is derived by:

submeshVertexCount=referenceSubmeshVertexCountClean+referenceSubmeshDupVertCount The k-th component of the position of the vertex with index v currentSubmeshVertexPositions[v][k] is derived as follows:

```
currentSubmeshVertexPositions[ v ][ k ] =
  referenceSubmeshVertexPositionsClean[ vr ][ k ] + currentSubmeshMotionVectors[ vm ][
k ]
where vr and vm are the corresponding indices that are assigned as follows:
index = v;
it = lower_bound(referenceSubmeshIntegratedIndices, index);
if (it != NULL && it[0][0] == index) {
      index = it[0][1];
      it = lower_bound(referenceSubmeshIntegratedIndices, index);
}
shift = distance(referenceSubmeshIntegratedIndices, it);
vr = index − shift;
vm = vr;
it_non_skip = find_if(sismu_multi_mv_idx, baseIntegrateIndices, v);
if (it_non_skip != NULL) {
      non_skip_index = distance(sismu_multi_mv_idx, it_non_skip);
      vm = referenceSubmeshVertexCountClean + non_skip_index;
}
The function find_if(sismu_multi_mv_idx, baseIntegrateIndices, v) returns a pointer pointing
to the first element i in sismu_multi_mv_idx that satisfies baseIntegrateIndices[i][0] == v, or
NULL if no such element is found.
```

The following arrays are derived during the submesh positions reconstruction process:

currentSubmeshMotionVectors, which is a 2D array of size submeshVertexCount by 3 indicating for each vertex v its motion vector in current frame.

currentSubmeshPredictedMotionVectors, which is a 2D array of size submeshVertexCount by 3 indicating for each vertex v its predicted motion vector.

Because some integrated vertices may have multiple motion vectors as signaled by sismu_multi_mv_idx, it is required to add the additional vertices with the number of sismu_multi_mv_num. This makes submeshMotionCount is larger than referenceSubmeshVertexCountClean and is derived by:

submeshMotionCount=referenceSubmeshVertexCountClean+sismu_multi_mv_num

When the vertex index v is larger than referenceSubmeshVertexCountClean, the additional vertex va is iteratively added according to sismu_multi_mv_idx as follows.

idx=sismu_multi_mv_idx[v−referenceSubmeshVertexCountClean];

integrate_to =referenceSubmeshIntegratedIndices [idx] [1];

it=lower_bound(referenceSubmeshIntegratedIndices, integrate_to);

shift=distance(referenceSubmeshIntegratedIndices, it);

va=integrate_to−shift;

The function lower_bound(referenceSubmeshIntegratedIndices, value) returns a pointer pointing to the first element in the referenceSubmeshIntegratedIndices whose second component equals to value, or NULL if no such element is found.

The function distance(vector, pointer) returns the index of the element in the vector that the pointer points to.

The k-th component of the motion vector associated with the vertex with index v, currentSubmeshMotionVectors[v][k] is derived as follows:

The group index g of the vertex with index v is derived as follows:

$$g=v/\text{motionGroupSize}$$

The prediction mode of the vertex with index v, sismu_mv_pred_mode_vertex[v], is equal to the prediction mode of the group with index g, sismu_mv_pred_mode_group[g]:

sismu_mv_pred_mode_vertex[v]=sismu_mv_pred_mode_group[g]

If the prediction mode sismu_mv_pred_mode[v] is equal to 0, then currentSubmeshMotionVectors[v][k]=VertexMotionVectorResiduals[v][k]

Otherwise (when sismu_mv_pred_mode[v] equals 1), currentSubmeshMotionVectors[v][k]=VertexMotionVectorResiduals [v] [k]+currentSubmeshPredictedMotionVectors [v] [k]

The predicted motion vector currentSubmeshPredictedMotionVectors [v] is derived by applying the following process:

```
for( k = 0; k < 3; k++ ) {
   mv[ k ] = 0
   count = 0
   for( n = 0; n < vertexNeighboursCounts[ v ]; n++ ) {
      w = vertexNeighbours[ v ][ n ]
      if ( w < v ) {
         mv[ k ] += currentSubmeshMotionVectors[ v ][ w ]
         count += 1
```

-continued

```
        }
      }
      if ( count > 1) {
        offset = count >> 1
        if ( mv[ k ] > 0 ) {
          mv [ k ]= (mv[ k ] + offset ) / count
        } else if ( mv[ k ] < 0 ) {
          mv [ k ]= −(−mv[ k ] + offset ) / count
        }
      }
      currentSubmeshPredictedMotionVectors[ v ] = mv
    }
```

H.11.4 Post-Reconstruction Process to Integrate Duplicated Vertices for INTRA Submeshes Inputs to this process are:

reconstructed submesh from INTRA submeshes

The outputs of this process are:

referenceSubmeshIntegratedIndices that is a 2D array of size referenceSubmeshDupVertCount by 2 indicating the index pairs of the duplicated vertices in the reconstructed submeshes.

referenceSubmeshDupVertCount.

an integrated submesh where the duplicated vertices are integrated and connectivity is updated.

This process is conducted as follows:

Step 1: search the duplicated vertices as follows. In the reconstructed submesh, all the pairs of duplicated vertices are searched in the reconstructed base mesh by iteratively checking if the geometry positions of two vertices are identical. Each pair of duplicated vertices (A(j), B(j)) has exactly the same geometry positions, where j=1, . . . , referenceSubmeshDupVertCount and A(j)>B(j). The list of the index pairs of the duplicated vertices forms a 2D array of size referenceSubmeshDupVertCount by 2, i.e., referenceSubmeshIntegratedIndices, which is one of the outputs. If there is no duplicated vertex, referenceSubmeshIntegratedIndices=NULL. NULL is a special pointer with a value of zero, which signals that the pointer is not intended to point to an accessible memory location.

Step 2: integrate the duplicated vertices as follows. After searching the duplicated vertices, we integrate all the pairs of duplicated vertices (A(j), B(j)) into one single integrated vertex B(j) in the reconstructed base mesh of reference frame. Integrating is to remove the geometry positions of A(j), replace the index of A(j) with B(j), and decrease by 1 to all the vertex indexes that are larger than A(j) in the connection. If referenceSubmeshIntegratedIndices=NULL, this step will be skipped.

H.11.5 Post-Reconstruction Process to Integrate Duplicated Vertices for INTER Submeshes Inputs to this process are:

reconstructed submesh from INTER submeshes referenceSubmeshIntegratedIndices that is a 2D array of size referenceSubmeshDupVertCount by 2 indicating the index pairs of the duplicated vertices in the INTRA reconstructed submeshes.

referenceSubmeshDupVertCount.

The outputs of this process are:

an integrated submesh

This process is conducted as follows:

Go through the list of (A(j), B(j)) in referenceSubmeshIntegratedIndices and merge (A(j), B(j)) into one single integrated vertex B(j) in the reconstructed base mesh of reference frame. Integrating is to remove the geometry positions of A(j), replace the index of A(j) with B(j), and decrease by 1 to all the vertex indexes that are larger than A(j) in the connection. If referenceSubmeshIntegratedIndices=NULL, this step will be skipped.

H.11.6 Vertex Neighbour Table Calculation

Inputs to this process are:

bmsps_inter_mesh_max_num_neighbors_minus1 submeshFaceCount, which is a variable indicating the number of faces in the current and in the reference submeshes.

submeshFaceIndices, which is a 2D array of size submeshFaceCount by 3 indicating the connectivity indices associated with the current and with the reference submeshes.

The outputs of this process are:

submeshVertexNeighboursCounts, which is a 1D array indicating the number of neighbours for each vertex of the submesh.

submeshVertexNeighbours, which is a 2D array of size submeshVertexCount by (bmsps_inter_mesh_max_num_neighbors_minus1+1) indicating for each vertex v the indices of its neighbours according to the mesh connectivity.

The the maximum number of neighbours maxVertexNeighbourCount is set equal to bmsps_inter_mesh_max_num_neighbors_minus1+1.

```
for( v = 0; v < submeshVertexCount; v++ ) {
  submeshVertexNeighboursCounts[ v ] = 0
}
for( f = 0; f < submeshFaceCount; f++ ) {
  v0 = submeshFaceIndices[ f ][ 0 ]
  v1 = submeshFaceIndices[ f ][ 1 ]
  v2 = submeshFaceIndices[ f ][ 2 ]
  AddNeighbour( v0, v1 )
  AddNeighbour( v1, v0 )
  AddNeighbour( v0, v2 )
  AddNeighbour( v2, v0 )
  AddNeighbour( v1, v2)
  AddNeighbour( v2, v1 )
}
AddNeighbour( vA, vB ) {
  vertex = vA;
  vertexNeighbor = vB;
  availableOld = 0
  nCount = submeshVertexNeighboursCounts [vertex];
  nCount = min(nCount, maxNumNeighborsMotion);
```

-continued

```
  if (vertex > vertexNeighbor) { // Check if vertexNeighbor is available
    for (n = 0; n < nCount; ++n) {
      if (submeshVertexNeighbours[vertex][n] == vertexNeighbor) {
          availableOld = 1;
          break;
      }
    }
    if (!availableOld) {
      if (nCount == maxNumNeighborsMotion) {
        submeshVertexNeighbours[vertex][maxNumNeighborsMotion − 1] = vertexNeighbor
      } else {
        submeshVertexNeighbours[vertex][nCount] = vertexNeighbor
        submeshVertexNeighboursCounts[vertex] = nCount + 1;
      }
    }
  }
}
```

The order in which the vertices of a mesh are encoded or decoded can change on a frame-by-frame basis (or a sequence-by-sequence basis etc. without loss of generality). Let scan[i][j], i=0, . . . , Ns−1, j=0, maxVertexNeighbourCount−1, denote the scanning order of vertices for a frame, where Ns is the number of different scan orders. The different scan orders may be based on depth first traversal of the mesh or a traversal along the direction where there are the most available already coded vertices of the mesh or any other traversal without loss of generality. In some embodiments, multiple vertex adjacency tables are calculated, one for each scan order. These vertex adjacency tables can be calculated at the end of the Intra mesh frame if the Ns scan orders that are going to be used in the mesh sequence is known a priori (via signaling or fixed in the standard). They can also be calculated in the first Inter mesh containing a particular scan order if the scan order is signaled on a frame-by-frame basis. The vertex adjacency table is then reused for subsequent Inter mesh frames containing that scan order.

In some embodiments, the maximum number of vertex neighbors is sent in the base mesh sequence parameter set as shown in Section H.8.1.3.1.1, above, using the syntax element bmsps_inter_mesh_max_num_neighbors_minus1.

In some embodiments, the vertex neighbor tables (submeshVertexNeighbours and submeshVertexNeighboursCounts) are calculated as shown in Section H.11.6, above.

In some embodiments, the duplicate vertices table (referenceSubmeshIntegratedIndices and referenceSubmeshDupVertCount) is created at the end of intra mesh frame processing and is reused for the inter mesh frame as shown in Section H.11.5, above.

In some embodiments, the vertex neighbor tables (submeshVertexNeighbours and submeshVertexNeighboursCounts) are reused for inter mesh frames as shown in Section H.11.3, above.

Figure 9:
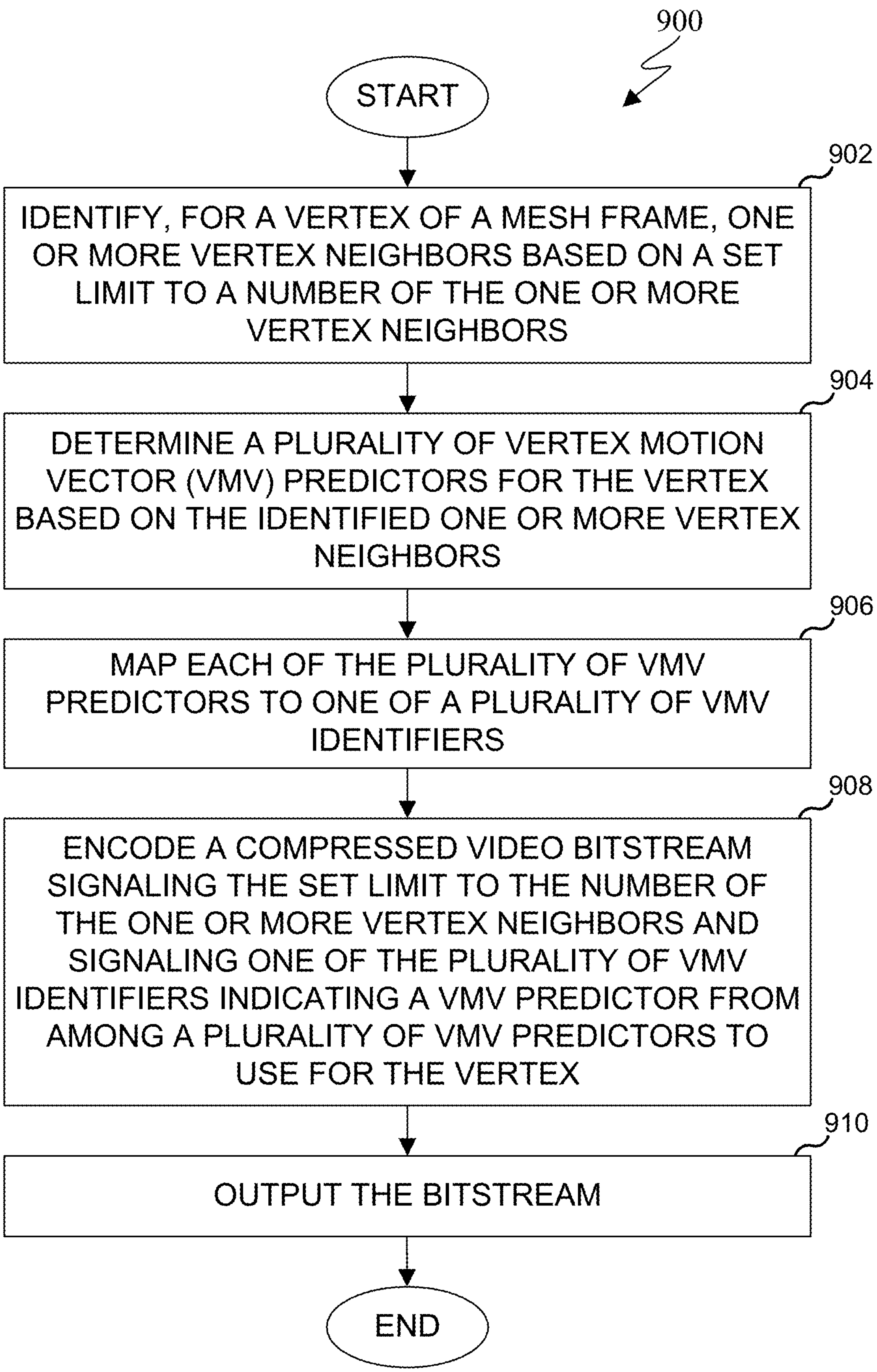
FIG. 9 illustrates an example encoding method for improved vertex motion vector predictor coding in accordance with this disclosure.

FIG. 9 illustrates an example encoding method 900 for improved vertex motion vector predictor coding in accordance with this disclosure. For ease of explanation, the method 900 of FIG. 9 is described as being performed using the electronic device 300 of FIG. 3. However, the method 900 may be used with any other suitable system and any other suitable electronic device.

As shown in FIG. 9, at step 902, the electronic device 300 identifies, for a vertex of a mesh frame, one or more vertex neighbors based on a set limit to a number of the one or more vertex neighbors. This can include the processor of the electronic device 300 identifying a last vertex neighbor in a sequence of neighbors associated with the vertex, and at least one additional vertex neighbor in the sequence of neighbors corresponding to the number of the one or more vertex neighbors, minus one. In some embodiments, the identified one or more vertex neighbors is associated with an intra mesh frame. In some embodiments, the electronic device 300 can reuse the identified one or more vertex neighbors for an inter mesh frame, as described in this disclosure.

At step 904, the electronic device 300 determines a plurality of vertex motion vector (VMV) predictors for the vertex based on the identified one or more vertex neighbors. At step 906, the electronic device 300 maps each of the plurality of VMV predictors to one of a plurality of VMV identifiers. For example, the VMV predictor can be a combination (e.g., an average, weighted average, median, max, min, etc.) of the one or more vertex neighbors.

At step 908, the electronic device 300 encodes a compressed video bitstream signaling the set limit to the number of the one or more vertex neighbors and signaling one of the plurality of VMV identifiers indicating a VMV predictor from among a plurality of VMV predictors to use for the vertex, such as described for example with respect to Table 2 of this disclosure. In various embodiments, the electronic device 300 encodes the set limit to the number of the one or more vertex neighbors in one of a sequence header, a frame header, a sub-mesh header, a slide header, a sub-frame header, or a tile header of the compressed video bitstream. In various embodiments, the electronic device 300 can also generate a duplicate vertices data structure storing information relating to duplicate vertices of one or more mesh frames. The electronic device 300 can also set a flag in the compressed video bitstream signaling that an inter mesh frame inherits the duplicate vertices data structure. In various embodiments, the encoder calculates the VMV predictor and transmits as part of the bitstream a delta difference between a VMV for a vertex and an associated predicted value of the VMV predictor.

At step 910, the electronic device 300 outputs the bitstream. This output bitstream can include the compressed base mesh bitstream, the displacement bitstream, and the attributes bitstream shown for example in FIG. 4, as well as the signaling elements described above. The output bitstream can be transmitted to an external device or to a storage on the electronic device 300.

Although FIG. 9 illustrates one example of an encoding method 900 for improved vertex motion vector predictor coding, various changes may be made to FIG. 9. For example, while shown as a series of steps, various steps in FIG. 9 may overlap, occur in parallel, or occur any number of times.

Figure 10:
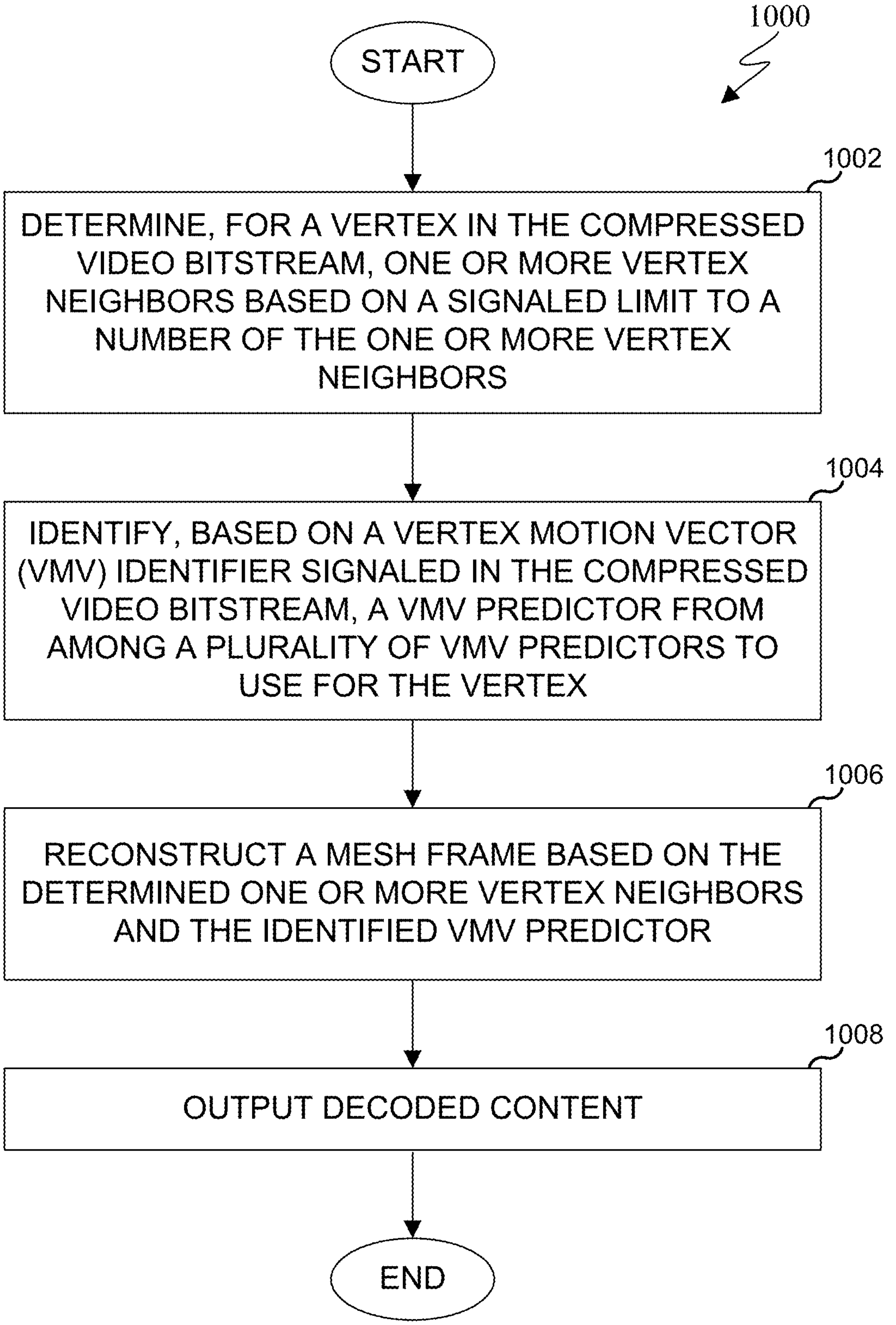
FIG. 10 illustrates an example decoding method for improved vertex motion vector predictor coding in accordance with this disclosure.

FIG. 10 illustrates an example decoding method 1000 for improved vertex motion vector predictor coding in accordance with this disclosure. For ease of explanation, the method 1000 of FIG. 10 is described as being performed using the electronic device 300 of FIG. 3. However, the method 1000 may be used with any other suitable system and any other suitable electronic device.

As shown in FIG. 10, at step 1002, the electronic device 300 receives a compressed bitstream and determines, for a vertex in the compressed video bitstream, one or more vertex neighbors based on a signaled limit to a number of the one or more vertex neighbors. This can include the processor of the electronic device identifying a last vertex neighbor in a received sequence of neighbors associated with the vertex, and at least one additional vertex neighbor in the received sequence of neighbors corresponding to the number of the one or more vertex neighbors, minus one. In various embodiments, the determined one or more vertex neighbors is associated with an intra mesh frame and the processor is further configured to reuse the determined one or more vertex neighbors for an inter mesh frame. In various embodiments, the signaled limit to the number of the one or more vertex neighbors is included in one of a sequence header, a frame header, a sub-mesh header, a slide header, a sub-frame header, or a tile header of the compressed video bitstream.

At step 1004, the electronic device 300 identifies, based on a vertex motion vector (VMV) identifier signaled in the compressed video bitstream, a VMV predictor from among a plurality of VMV predictors to use for the vertex. As described in this disclosure, the VMV predictor can be the associated predicted value. As also described in this disclosure, the associated predicted value is a combination (e.g., an average, weighted average, median, max, min, etc.) of the one or more vertex neighbors. In various embodiments, the decoder calculates the VMV predictor, which is based on already reconstructed VMVs, where this reconstructed VMV is a predicted VMV plus a received delta difference between a VMV for a vertex and an associated predicted value of the VMV predictor.

At step 1006, the electronic device 300 reconstructs a mesh frame based on the determined one or more vertex neighbors and the identified VMV predictor. In various embodiments, the electronic device 300 also can obtain a duplicate vertices data structure storing information relating to duplicate vertices of one or more mesh frames and determine, based on a flag signaled in the compressed video bitstream, that an inter mesh frame inherits the duplicate vertices data structure.

At step 1008, the electronic device 300 outputs the decoded content, such as including a reconstructed mesh-frame. The reconstructed mesh-frame corresponds to an original mesh frame used during encoding, as described in this disclosure. The output decoded content can be transmitted to an external device or to a storage on the electronic device 300.

Although FIG. 10 illustrates one example of a decoding method 1000 for improved vertex motion vector predictor coding, various changes may be made to FIG. 10. For example, while shown as a series of steps, various steps in FIG. 10 may overlap, occur in parallel, or occur any number of times.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. An apparatus comprising:
- a communication interface configured to receive a compressed video bitstream; and
- a processor operably coupled to the communication interface, the processor configured to:
  - determine, for a vertex in the compressed video bitstream, one or more vertex neighbors based on a signaled limit to a number of the one or more vertex neighbors used for a calculation of a vertex motion vector (VMV) predictor;
  - identify, based on a VMV identifier signaled in the compressed video bitstream, the VMV predictor from among a plurality of VMV predictors to use for the vertex; and
  - reconstruct a mesh frame based on the determined one or more vertex neighbors and the identified VMV predictor.

2. The apparatus of claim 1, wherein, to determine the one or more vertex neighbors, the processor is further configured to identify a last vertex neighbor in a received sequence of neighbors associated with the vertex, and at least one additional vertex neighbor in the received sequence of neighbors corresponding to the number of the one or more vertex neighbors minus one.

3. The apparatus of claim 1, wherein the determined one or more vertex neighbors is associated with an intra mesh frame and the processor is further configured to reuse the determined one or more vertex neighbors for an inter mesh frame.

4. The apparatus of claim 1, wherein the processor is further configured to:
- obtain a duplicate vertices data structure storing information relating to duplicate vertices of one or more mesh frames; and
- determine, based on a flag signaled in the compressed video bitstream, that an inter mesh frame inherits the duplicate vertices data structure.

5. The apparatus of claim 1, wherein the processor is further configured to receive a delta difference between a VMV for the vertex and an associated predicted value of the VMV predictor.

6. The apparatus of claim 5, wherein the associated predicted value is a combination of the one or more vertex neighbors.

7. The apparatus of claim 1, wherein the signaled limit to the number of the one or more vertex neighbors is included in one of a sequence header, a frame header, a sub-mesh header, a slice header, a sub-frame header, or a tile header of the compressed video bitstream.

8. A method comprising:
- determining, for a vertex in a compressed video bitstream, one or more vertex neighbors based on a signaled limit to a number of the one or more vertex neighbors used for a calculation of a vertex motion vector (VMV) predictor;
- identifying, based on a VMV identifier signaled in the compressed video bitstream, the VMV predictor from among a plurality of VMV predictors to use for the vertex; and reconstructing a mesh frame based on the determined one or more vertex neighbors and the identified VMV predictor.

9. The method of claim 8, wherein determining the one or more vertex neighbors includes identifying a last vertex neighbor in a received sequence of neighbors associated with the vertex, and at least one additional vertex neighbor in the received sequence of neighbors corresponding to the number of the one or more vertex neighbors minus one.

10. The method of claim 8, wherein the determined one or more vertex neighbors is associated with an intra mesh frame, and the method further comprises reusing the determined one or more vertex neighbors for an inter mesh frame.

11. The method of claim 8, further comprising:

obtaining a duplicate vertices data structure storing information relating to duplicate vertices of one or more mesh frames; and determining, based on a flag signaled in the compressed video bitstream, that an inter mesh frame inherits the duplicate vertices data structure.

12. The method of claim 8, further comprising receiving a delta difference between a VMV for the vertex and an associated predicted value of the VMV predictor.

13. The method of claim 12, wherein the associated predicted value is a combination of the one or more vertex neighbors.

14. The method of claim 8, wherein the signaled limit to the number of the one or more vertex neighbors is included in one of a sequence header, a frame header, a sub-mesh header, a slide header, a sub-frame header, or a tile header of the compressed video bitstream.

15. An apparatus comprising:

a communication interface; and a processor operably coupled to the communication interface, the processor configured to:

identify, for a vertex of a mesh frame, one or more vertex neighbors based on a set limit to a number of the one or more vertex neighbors used for a calculation of a vertex motion vector (VMV) predictor;

determine a plurality of VMV predictors for the vertex based on the identified one or more vertex neighbors;

map each of the plurality of VMV predictors to one of a plurality of VMV identifiers; and encode a compressed video bitstream signaling the set limit to the number of the one or more vertex neighbors and signaling one of the plurality of VMV identifiers indicating the VMV predictor from among the plurality of VMV predictors to use for the vertex.

16. The apparatus of claim 15, wherein, to determine the one or more vertex neighbors, the processor is further configured to identify a last vertex neighbor in a sequence of neighbors associated with the vertex, and at least one additional vertex neighbor in the sequence of neighbors corresponding to the number of the one or more vertex neighbors minus one.

17. The apparatus of claim 15, wherein the identified one or more vertex neighbors is associated with an intra mesh frame and the processor is further configured to reuse the identified one or more vertex neighbors for an inter mesh frame.

18. The apparatus of claim 15, wherein the processor is further configured to:

generate a duplicate vertices data structure storing information relating to duplicate vertices of one or more mesh frames; and set a flag in the compressed video bitstream signaling that an inter mesh frame inherits the duplicate vertices data structure.

19. The apparatus of claim 15, wherein the processor is further configured to cause transmission of a delta difference between a VMV for the vertex and an associated predicted value of the VMV predictor, and wherein the associated predicted value is a combination of the one or more vertex neighbors.

20. The apparatus of claim 15, wherein the processor is further configured to encode the set limit to the number of the one or more vertex neighbors in one of a sequence header, a frame header, a sub-mesh header, a slide header, a sub-frame header, or a tile header of the compressed video bitstream.

* * * * *